US008571876B2

(12) United States Patent
Baeckstroem et al.

(10) Patent No.: US 8,571,876 B2
(45) Date of Patent: Oct. 29, 2013

(54) APPARATUS, METHOD AND COMPUTER PROGRAM FOR OBTAINING A PARAMETER DESCRIBING A VARIATION OF A SIGNAL CHARACTERISTIC OF A SIGNAL

(75) Inventors: Tom Baeckstroem, Nuremberg (DE); Stefan Bayer, Nuremberg (DE); Ralf Geiger, Erlangen (DE); Max Neuendorf, Nuremberg (DE); Sascha Disch, Fuerth (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 13/186,688

(22) Filed: Jul. 20, 2011

(65) Prior Publication Data

US 2011/0313777 A1 Dec. 22, 2011

Related U.S. Application Data

(63) Continuation of application No. PCT/EP2010/050229, filed on Jan. 11, 2010.

(60) Provisional application No. 61/146,063, filed on Jan. 21, 2009.

(30) Foreign Application Priority Data

Apr. 17, 2009 (EP) .................................... 09005486

(51) Int. Cl.
*G01L 19/00* (2013.01)

(52) U.S. Cl.
USPC ........... 704/500; 704/501; 704/502; 704/503; 704/504

(58) Field of Classification Search
USPC ................................. 704/203–211, 500–504
See application file for complete search history.

(56) References Cited

U.S. PATENT DOCUMENTS

| | | | | |
|---|---|---|---|---|
| 6,035,271 | A | 3/2000 | Chen | |
| 6,757,649 | B1 * | 6/2004 | Gao et al. | 704/222 |
| 2002/0108122 | A1 | 8/2002 | Alao et al. | |

(Continued)

FOREIGN PATENT DOCUMENTS

| | | | |
|---|---|---|---|
| KR | 1020080044835 | A | 5/2008 |
| TW | 200737127 | A | 10/2007 |
| WO | 2007/051548 | A1 | 5/2007 |

OTHER PUBLICATIONS

Official Communication issued in International Patent Application No. PCT/EP2010/050229, mailed on Mar. 30, 2010.

(Continued)

*Primary Examiner* — Leonard Saint Cyr
(74) *Attorney, Agent, or Firm* — Keating & Bennett, LLP

(57) ABSTRACT

An apparatus for obtaining a parameter describing a variation of a signal characteristic of a signal on the basis of actual transform-domain parameters describing the audio signal in transform-domain includes a parameter determinator. The parameter determinator is configured to determine one or more model parameters of a transform-domain variation model describing an evolution of the transform-domain parameters in dependence on one or more model parameters representing a signal characteristic, such that a model error, representing a deviation between a modeled temporal evolution of the transform-domain parameters and an evolution of the actual transform-domain parameters, is brought below a predetermined threshold value or minimized.

30 Claims, 9 Drawing Sheets

(56) References Cited

U.S. PATENT DOCUMENTS

| | | | | |
|---|---|---|---|---|
| 2005/0182626 | A1* | 8/2005 | Kim et al. | 704/245 |
| 2005/0192799 | A1* | 9/2005 | Kim et al. | 704/229 |
| 2006/0056383 | A1* | 3/2006 | Black et al. | 370/350 |
| 2007/0276894 | A1* | 11/2007 | Huang et al. | 708/403 |
| 2008/0010062 | A1* | 1/2008 | Son et al. | 704/219 |
| 2008/0037805 | A1 | 2/2008 | Kino et al. | |

OTHER PUBLICATIONS

Bistritz et al., "Immittance Spectral Pairs (ISP) for Speech Encoding," IEEE Acoustic Speech Signal Processing, Apr. 27-30, 1993, pp. 9-12, Minneapolis, MN.

de Cheveigne et al., "Yin, A Fundamental Frequency Estimator for Speech and Music," Journal Acoustic Society of America, Apr. 2002, pp. 1917-1930.

Edler et al., "Time Warped MDCT," Mar. 28, 2008, pp. 1-6.

Herre et al., "Enhancing the Performance of Perceptual Audio Coders by Using Temporal Noise Shaping (TNS)," 101st AES Convention, Nov. 8-11, 1996, 25 pages, Los Angeles, CA.

Harma, "Linear Predictive Coding With Modified Filter Structures." IEEE Transactions on Speech and Audio Processing, vol. 9, No. 8, Nov. 2001, pp. 769-777.

Makhoul, "Linear Prediction: A Tutorial Review," Proceeding of the IEEE, vol. 63, No. 4, Apr. 1975, pp. 561-580.

Paliwal, "Interpolation Properties of Linear Prediction Parametrics Representations," 4th European Conference on Speech Communications and Technology Eurospeech, Sep. 18-21, 1995, pp. 1029-1032, Madrid, Spain.

Wolfel et al., "Minimum Variance Distortionless Response Spectral Estimation," IEEE Signal Processing Magazine, Sep. 2005, pp. 117-126.

Backstrom et al., "Parametric AM/FM Decomposition for Speech and Audio Coding," IEEE Workshop on Applications of Signal Processing to Audio and Acoustics, Oct. 18-21, 2009, pp. 333-336, New Paltz, NY.

Official Communication issued in corresponding Taiwanese Patent Application No. 10220729090, mailed on Jun. 7, 2013.

* cited by examiner

Pitch variation estimation

Variation estimation

APPARATUS, METHOD AND COMPUTER PROGRAM FOR OBTAINING A PARAMETER DESCRIBING A VARIATION OF A SIGNAL CHARACTERISTIC OF A SIGNAL

CROSS-REFERENCE TO RELATED APPLICATIONS

This application is a continuation of copending International Application No. PCT/EP2010/050229, filed Jan. 11, 2010, which is incorporated herein by reference in its entirety, and additionally claims priority from U.S. Application 61/146,063, filed Jan. 21, 2009, and from European Application EP 09005486.7, filed Apr. 17, 2009, which are all incorporated herein by reference in their entirety.

BACKGROUND OF THE INVENTION

Embodiments according to the invention are related to an apparatus, a method and a computer program for obtaining a parameter describing a variation of a signal characteristic of a signal on the basis of actual transform-domain parameters describing the audio signal in a transform domain.

Embodiments according to the invention are related to an apparatus, a method and a computer program for obtaining a parameter describing a temporal variation of a signal characteristic of an audio signal on the basis of actual transform-domain parameters describing the audio signal in a transform domain.

Further embodiments according to the invention are related to signal variation estimation.

While the primary scope of the current invention is analysis of temporal variations of audio signals, the same method can be readily adapted to any digital signal and the variations that such signals exhibit on any of their axis. Such signals and variations include, for example, spatial and temporal variations in characteristics such as intensity and contrast of images and movies, modulations (variations) in characteristics such as amplitude and frequency of radar and radio signals, and variations in properties such as heterogeneity of electrocardiogram signals.

In the following, a brief introduction regarding the concept of signal variation estimation will be given. Classical signal processing usually begins with the assumption of locally stationary signals and for many applications, this is a reasonable assumption. However, to claim that signals such as speech and audio are locally stationary stretches the truth beyond acceptable levels in some cases. Signals whose characteristics rapidly change introduce distortions to analysis results that are difficult to contain by classical approaches and thus necessitate methodology specially tailored for rapidly varying signals.

For example, the coding of a speech signal with a transform based coder may be considered. Here, the input signal is analyzed in windows, whose contents are transformed to the spectral domain. When the signal is a harmonic signal whose fundamental frequency rapidly changes, the locations of spectral peaks, corresponding to the harmonics, change over time. If, for example, the analysis window length is relatively long in comparison to the change in fundamental frequency, the spectral peaks are spread to neighboring frequency bins. In other words, the spectral representation becomes smeared. This distortion may be specially severe at the upper frequencies, where the location of spectral peaks more rapidly moves when the fundamental frequency changes.

While methods exist for compensation of changes in the fundamental frequency, such as time-warped-modified-discrete-cosine-transform (TW-MDCT) (see references [8] and [3]), pitch variation estimation has remained a challenge.

In the past, pitch variation has been estimated by measuring the pitch and simply taking the time derivative. However, since pitch estimation is a difficult and often ambiguous task, the pitch variation estimates were littered with errors. Pitch estimation suffers, among others, from two types of common errors (see, for example, reference [2]). Firstly, when the harmonics have greater energy than the fundamental, estimators are often distracted to believe that the harmonic is actually the fundamental, whereby the output is a multiple of the true frequency. Such errors can be observed as discontinuities in the pitch track and produce a huge error in terms of the time derivative. Secondly, most pitch estimation methods basically rely on peak picking in the auto correlation (or similar) domain(s) by some heuristic. Especially in the case of varying signals, these peaks are broad (flat at the top), whereby a small error in the autocorrelation estimate can move the estimated peak location significantly. The pitch estimate is thus an unstable estimate.

As indicated above, the general approach in signal processing is to assume that the signal is constant in short time intervals and estimate the properties in such intervals. If, then, the signal is actually time-varying, it is assumed that the time evolution of the signal is sufficiently slow, so that the assumption of stationarity in a short interval is sufficiently accurate and analysis in short intervals will not produce significant distortion.

In view of the above, it is desirable to provide a concept for obtaining a parameter describing a temporal variation of a signal characteristic with improved robustness.

SUMMARY

According to an embodiment, an apparatus for obtaining one or more model parameters describing a variation of a signal characteristic of an audio signal on the basis of actual transform domain parameters of a transform domain representation of the signal describing the signal in a transform domain may have: a parameter determinator configured to determine one or more model parameters of a transform-domain variation model, the variation model describing an evolution of transform domain parameters in dependence on the one or more model parameters, such that a model error, representing a deviation between a modeled evolution of the transform domain parameters and an evolution of the actual transform domain parameters, is brought below a predetermined threshold value or minimized; wherein the apparatus is configured to obtain, as the actual transform-domain parameters, first transform domain information which comprises a first set of transform domain parameters and describes the audio signal for a first time interval for a plurality of different values of the transform variable, and second transform domain information describing the audio signal for a second time interval for the different values of the transform variable; wherein the parameter determinator is configured to evaluate, for a plurality of different values of the transform variable, a temporal variation between the first transform domain information and the second transform domain information, to obtain temporal variation information, to estimate a local variation of the transform domain information over the transform variable for a plurality of different values of the transform variable, to obtain a local variation information, and to combine the temporal variation information and the local variation information, to obtain a frequency variation model parameter; wherein the parameter determinator is configured to obtain the frequency variation model parameter using a transform domain variation model comprising the frequency variation model parameter and representing a compression or expansion of the transform domain representation of the audio signal with respect to the transform variable assuming a smooth frequency variation of the audio signal; wherein the parameter determinator is configured to determine the frequency variation model parameter such that the parameterized transform-domain variation model is adapted to the first set of transform domain parameters and the second set of transform domain parameters.

According to another embodiment, a method for obtaining one or more model parameters describing a variation of a signal characteristic for an audio signal on the basis of actual transform-domain parameters describing the audio signal in a transformed domain may have the steps of: determining one or more model parameters of a transform-domain variation model, the variation model describing an evolution of transform-domain parameters in dependence on the one or more model parameters, such that a model error, representing a deviation between a modeled temporal evolution of the transform-domain parameters and an evolution of the actual transform-domain parameters, is brought below a predetermined threshold value or minimized; wherein first transform domain information comprising a first set of transform domain parameters and describing the audio signal for a first time interval for a plurality of different values of a transform variable, and second transform domain information comprising a second set of transform domain parameters and describing the audio signal for a second time interval for the different values of the transform variable are obtained as the actual transform-domain parameters; wherein a temporal variation between the first transform domain information and the second transform domain information is evaluated for a plurality of different values of the transform variable, to obtain temporal variation information, wherein a local variation of the transform domain information over the transform variable is estimated for a plurality of different values of the transform variable, to obtain a local variation information; wherein the temporal variation information and the local variation information are combined, to obtain a frequency variation model parameter; wherein the frequency variation model parameter is obtained using a transform domain variation model comprising the frequency variation model parameter and representing a compression or expansion of the transform domain representation of the audio signal with respect to the transform variable assuming a smooth frequency variation of the audio signal; and wherein the frequency variation model parameter is determined such that the parameterized transform-domain variation model is adapted to the first set of transform domain parameters and the second set of transform domain parameters.

According to another embodiment, an apparatus for obtaining one or more model parameters describing a variation of a signal characteristic of an audio signal on the basis of actual transform domain parameters of a transform domain representation of the audio signal describing the audio signal in a transform domain may have: a parameter determinator configured to determine one or more model parameters of a transform-domain variation model, the variation model describing an evolution of transform domain parameters in dependence on the one or more model parameters, such that a model error, representing a deviation between a modeled evolution of the transform domain parameters and an evolution of the actual transform domain parameters, is brought below a predetermined threshold value or minimized; wherein the apparatus is configured to obtain autocovariance information describing an autocovariance of the audio signal for a single autocovariance window but for different autocovariance lag values, to evaluate, for a plurality of different pairs of autocovariance lag values, weighted differences between the pairs of autocovariance values, wherein the weight is chosen in dependence on a difference of the lag values of the respective pairs of lag values, and in dependence on a variation of the autocovariance values over lag, to sum-combine different weighted difference values, to obtain a combination value, and to obtain the model parameters on the basis of the combination value.

According to another embodiment, a method for obtaining one or more model parameters describing a variation of a signal characteristic for an audio signal on the basis of actual transform-domain parameters of a transform-domain representation of the audio signal describing the audio signal in a transformed domain may have the steps of: determining one or more model parameters of a transform-domain variation model, the transform-domain variation model describing an evolution of transform-domain parameters in dependence on the one or more model parameters, such that a model error, representing a deviation between a modeled temporal evolution of the transform-domain parameters and an evolution of the actual transform-domain parameters, is brought below a predetermined threshold value or minimized; wherein an autocovariance information describing an autocovariance of the audio signal for a single autocovariance window but for different autocovariance lag values is obtained; wherein weighted differences between pairs of autocovariance values are evaluated for a plurality of different pairs of autocovariance lag values, wherein the weight is chosen in dependence on a difference of the lag values of the respective pairs of lag values, and in dependence on a variation of the autocovariance values over lag, wherein different weighted difference values are sum-combined, to obtain a combination value; and wherein the one or more model parameters are obtained on the basis of the combination value.

According to another embodiment, an apparatus for obtaining one or more model parameters describing a variation of a signal characteristic of an audio signal on the basis of actual transform domain parameters of a transform-domain representation of the audio signal describing the audio signal in a transform domain may have: a parameter determinator configured to determine one or more model parameters of a transform-domain variation model, the variation model describing an evolution of transform domain parameters in dependence on the one or more model parameters, such that a model error, representing a deviation between a modeled evolution of the transform domain parameters and an evolution of the actual transform domain parameters, is brought below a predetermined threshold value or minimized; wherein the apparatus is configured to obtain a model parameter describing a temporal variation of an envelope of the audio signal, wherein the parameter determinator is configured to obtain a plurality of transform-domain parameters describing a signal power of the audio signal for a plurality of time intervals, wherein the parameter determinator is configured to obtain the envelope variation model parameter using a representation of a parameterized transform-domain variation model comprising the envelope variation model parameter and representing a temporal increase in power or a temporal decrease in power of the transform-domain representation of the audio signal assuming a smooth envelope variation of the audio signal, and wherein the parameter determinator is configured to determine the envelope variation model parameter such that the parameterized transform-domain variation model is adapted to the transform-domain parameters; and wherein the parameter determinator is configured to obtain a plurality of autocorrelation parameters or autocovariance parameters for a given autocorrelation lag or autocovariance lag, and wherein the parameter determinator is configured to determine a plurality of polynomial parameters of a polynomial envelope variation model.

According to another embodiment, a method for obtaining one or more model parameters describing a variation of a signal characteristic for an audio signal on the basis of actual transform-domain parameters of a transform-domain representation of the audio signal describing the audio signal in a transformed domain my have the steps of: determining one or more model parameters of a transform-domain variation model, the variation model describing an evolution of transform-domain parameters in dependence on the one or more model parameters, such that a model error, representing a deviation between a modeled temporal evolution of the transform-domain parameters and an evolution of the actual transform-domain parameters, is brought below a predetermined threshold value or minimized; wherein a plurality of transform-domain parameters describing a signal power of the audio signal for a plurality of time intervals is obtained; wherein a plurality of polynomial parameters of a polynomial envelope variation model are determined, wherein the envelope variation model parameters are obtained using a representation of a parameterized transform-domain variation model comprising the envelope variation model parameters and representing a temporal increase in power or a temporal decrease in power of the transform-domain representation of the audio signal assuming a smooth envelope variation of the audio signal, wherein the envelope variation model parameters are determined such that the parameterized transform-domain variation model is adapted to the transform-domain parameters, wherein a plurality of autocorrelation parameters or autocovariance parameters are obtained for a given autocorrelation lag or autocovariance lag.

According to another embodiment, an apparatus for obtaining one or more model parameters describing a variation of a signal characteristic of an audio signal on the basis of actual transform domain parameters of a transform domain representation of the audio signal describing the audio signal in a transform domain may have: a parameter determinator configured to determine one or more model parameters of a transform-domain variation model, the variation model describing an evolution of transform domain parameters in dependence on one or more model parameters, such that a model error, representing a deviation between a modeled evolution of the transform domain parameters and an evolution of the actual transform domain parameters, is brought below a predetermined threshold value or minimized; wherein the apparatus comprises a formant-structure-reducer configured to preprocess an input audio signal, to obtain a formant-structure-reduced audio signal; wherein the apparatus is configured to obtain the actual transform-domain parameter on the basis of the formant-structure-reduced audio signal; wherein the formant-structure-reducer is configured to estimate parameters of a linear-predictive model of the input audio signal on the basis of a high-pass filtered version of the input audio signal, and to filter a broad band version of the input audio signal on the basis of the estimated parameters of the linear-predictive model, to obtain the formant-structure-reduced audio signal such that the formant-structure-reduced audio signal comprises a low-pass characteristic.

According to another embodiment, a method for obtaining one or more model parameters describing a variation of a signal characteristic for an audio signal on the basis of actual transform-domain parameters of a transform-domain representation of the audio signal describing the audio signal in a transformed domain may have the steps of: determining one or more model parameters of a transform-domain variation model, the variation model describing an evolution of transform-domain parameters in dependence on one or more model parameters, such that a model error, representing a deviation between a modeled temporal evolution of the transform-domain parameters and an evolution of the actual transform-domain parameters, is brought below a predetermined threshold value or minimized; wherein an input audio signal is preprocessed, to obtain a formant-structure-reduced audio signal; wherein the actual transform-domain parameter is obtained on the basis of the formant-structure-reduced audio signal; wherein parameters of a linear-predictive model of the input audio signal are estimated on the basis of a high-pass filtered version of the input audio signal; wherein a broad band version of the input audio signal is filtered on the basis of the estimated parameters of the linear-predictive model, to obtain the formant-structure-reduced audio signal such that the formant-structure-reduced audio signal comprises a low-pass characteristic.

Another embodiment may have a computer program for performing the inventive methods, when the computer program runs in a computer.

According to another embodiment, a time-warped audio encoder for time-warped encoding an input audio signal may have: an inventive apparatus for obtaining a parameter describing a temporal variation of a signal characteristic of an audio signal, wherein the apparatus for obtaining a parameter is configured to obtain a pitch variation parameter describing a temporal pitch variation of the input audio signals; and a time-warped-signal processor configured to perform a time-warped signal sampling of the input audio signal using the pitch variation parameter for an adjustment of the time-warp.

An embodiment according to the invention creates an apparatus for obtaining a parameter describing a temporal variation of a signal characteristic of an audio signal on the basis of actual transform-domain parameters describing the audio signal in a transform domain. The apparatus comprises a parameter determinator configured to determine one or more model parameters of a transform-domain variation model describing a temporal evolution of transform-domain parameters in dependence on one or more model parameters representing a signal characteristic, such that a model error, representation a deviation between a modeled temporal evolution of the transformed-domain parameters and a temporal evolution of the actual transform-domain parameters, is brought below a predetermined threshold value or is minimized.

This embodiment is based on the finding that typical temporal variations of an audio signal result in a characteristic temporal evolution in the transform-domain, which can be well described using only a limited number of model parameters. While this is particularly true for voice signals, where the characteristic temporal evolution is determined by the typical anatomy of the human speech organs, the assumption holds over a wide range of audio and other signals, like typical music signals.

Further, the typically smooth temporal evolution of a signal characteristic (like, for example, a pitch, an envelope, a tonality, a noisiness, and so on) can be considered by the transform-domain variation model. Accordingly, the usage of a parameterized transform-domain variation model may even serve to enforce (or to consider) the smoothness of the estimated signal characteristic. Thus, discontinuities of the estimated signal characteristic, or of the derivative thereof, can be avoided. By choosing the transform-domain variation model accordingly, any typical restrictions can be imposed on the modeled variation of the signal characteristics, like, for example, a limited rate of variation, a limited range of values, and so on. Also, by choosing the transform-domain variation model appropriately, the effects of harmonics can be considered, such that, for example, an improved reliability can be obtained by simultaneously modeling a temporal evolution of a fundamental frequency and the harmonic thereof.

Further, by using a variation modeling in the transform-domain, the effect of signal distortions may be restricted. While some kinds of distortion (for example, a frequency-dependent signal delay) result in a severe modification of a signal wave form, such distortion may have a limited impact on the transform-domain representation of a signal. As it is naturally desirable to also precisely estimate signal characteristics in the presence of distortions, the usage of the transform-domain has shown to be a very good choice.

To summarize the above, the usage of a transform-domain variation model, the parameters of which are adapted to bring the parameterized transform-domain variation model (or the output thereof) in agreement with an actual temporal evolution of actual transform-domain parameters describing an input audio signal, enables that the signal characteristics of a typical audio signal can be determined with good precision and reliability.

In an embodiment, the apparatus may be configured to obtain, as the actual transform-domain parameters, a first set of transform-domain parameters describing a first time interval of the audio signal in the transform-domain for a predetermined set of values of a transformation variable (also designated herein as "transform variable"). Similarly, the apparatus may be configured to obtain a second set of transform-domain parameters describing a second time interval of the audio signal in the transform-domain for the predetermined set of values of the transformation variable. In this case, the parameter determinator may be configured to obtain a frequency (or pitch) variation model parameter using a parameterized transform-domain variation model comprising a frequency-variation (or pitch-variation) parameter and representing a compression or expansion of the transform-domain representation of the audio signal with respect to the transformation variable assuming a smooth frequency variation of the audio signal. The parameter determinator may be configured to determine the frequency variation parameter such that the parameterized transform-domain variation model is adapted to the first set of transform-domain parameters and to the second set of transform-domain parameters. By using this approach, a very efficient usage can be made of the information available in the transform-domain. It has been found that a transform-domain representation of an audio signal (for example, an autocorrelation domain representation, an autocovariance domain representation, a Fourier transform domain representation, a discrete-cosine-transform domain representation, and so on) is smoothly expanded or compressed with varying fundamental frequency or pitch. By modeling this smooth compression or expansion of the transform-domain representation, the full information content of the transform-domain representation may be exploited, as multiple samples of the transform-domain representation (for different values of the transformation variable) may be matched.

In an embodiment, the apparatus may be configured to obtain, as the actual transform-domain parameters, transform-domain parameters describing the audio signal in the transform-domain as a function of a transform variable. The transform-domain may be chosen such that a frequency transposition of the audio signal results at least in a frequency shift of the transform-domain representation of the audio signal with respect to the transform variable, or in a stretching of the transform-domain representation with respect to the transform variable, or in a compression of the transform-domain representation with respect to the transform variable. The parameter determiner may be configured to obtain a frequency-variation model parameter (or pitch-variation model parameter) on the basis of a temporal variation of corresponding (e.g. associated with the same value of the transform variable) actual transform-domain parameters, taking into consideration a dependency of the transform-domain representation of the audio signal from the transform variable. Using this approach, the information about a temporal variation of corresponding actual transform-domain parameters (e.g. transform-domain parameters for identical autocorrelation lag, autocovariance lag, or Fourier-transform frequency bin) can be evaluated separately for the information regarding a dependence of the transform-domain representation from the transformation variable. Subsequently, the separately calculated information can be combined. Thus, a particularly efficient way is available to estimate the expansion or compression of the transform-domain representation, for example, by comparing multiple pairs of transform domain parameters and taking into consideration an estimated local gradient of the transform-parameter-dependent variation of the transform-domain representation. In other words, the local slope of the transform-domain representation, in dependence on the transform parameter, and the temporal change of the transform-domain representation (for example, across subsequent windows) can be combined to estimate a magnitude of the temporal compression or expansion of the transform-domain representation, which in return is a measure of a temporal frequency variation or pitch variation.

Further embodiments are also defined in the dependent claims.

Another embodiment according to the invention creates a method for obtaining a parameter describing a temporal variation of a signal characteristic of an audio signal on the basis of actual transform-domain parameters describing the audio signal in a transform-domain.

Yet another embodiment creates a computer program for obtaining a parameter describing a temporal variation of a signal characteristic of an audio signal.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
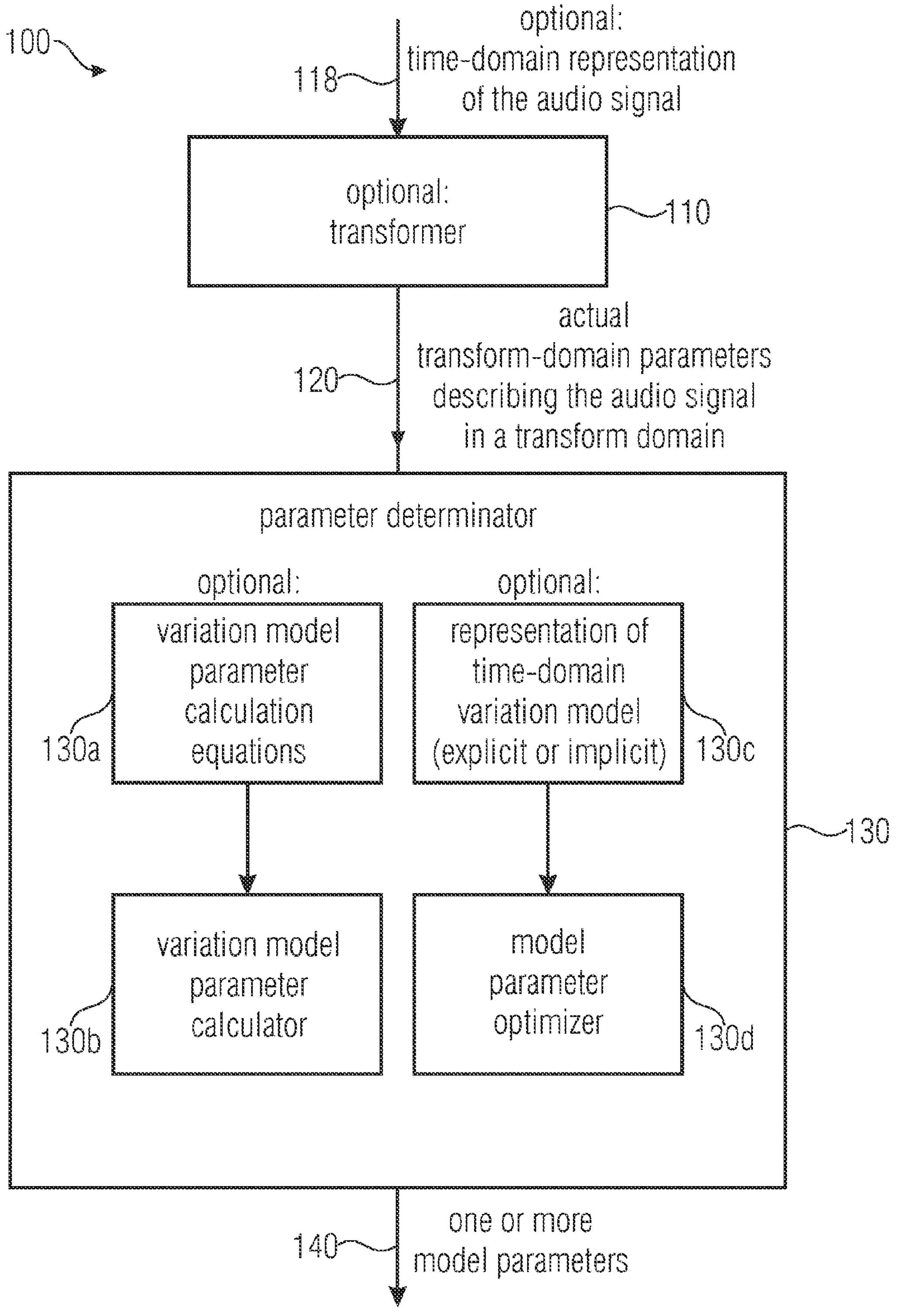
FIG. 1*a* shows a block schematic diagram of an apparatus for obtaining a parameter describing a temporal variation of a signal characteristic of an audio signal.

In the following, the concept of variation modeling will be described in general in order to facilitate the understanding of the present invention. Subsequently, a generic embodiment according to the invention will be described taking reference to FIGS. 1*a* and 1*b*. Subsequently, more specific embodiments will be described taking reference to FIGS. 2 to 5. Finally, the application of the inventive concept for an audio signal encoding will be described taking reference to FIG. 6, and a summary will be given taking reference to FIG. 7.

In order to avoid confusion, the terminology will be used as follows:

with the term "variation" we refer to a general set of functions that describes the change in characteristics in time, and the (partial) derivative $\partial/\partial x$ is used as a mathematically accurately defined entity.

In other words, "variation" refers to signal characteristics (on an abstract level), whereas "derivative" is used whenever the mathematical definition $\partial/\partial x$ is used, for example, as the k (autocorrelation-lag/autocovariance lag) or t (time) derivatives of autocorrelation/covariance.

Any other measures of change will be explained in words, typically without using the term "variation".

Further, embodiments according to the invention will subsequently be described for an estimation of temporal variation of audio signals. However, the present invention is not restricted to only audio signals and only temporal variations. Rather embodiments according to the invention can be applied to estimate general variations of signals, even though the invention is at present mainly used for estimating temporal variations of audio signals.

Variation Modeling

General Overview on Variation Modeling

Generally speaking, embodiments according to the invention use variation models for the analysis of an input audio signal. Thus, the variation model is used to provide a method for estimating the variation.

Assumptions for Variation Modeling

In the following, some differences between a conventional signal characteristic estimation and the concept applied in the embodiments according to the present invention will be discussed.

Whereas traditional methods assume that characteristics of the signal (for example, an audio signal) are constant (or stationary) in short windows of time, it is one of primary approaches of the current invention to assume that the (normalized) rate of change (e.g. of a signal characteristic, (like a pitch or an envelope)) is constant in a short window of time. Therefore, while traditional methods can handle stationary signals as well as, within a modest level of distortion, slowly changing signals, some embodiments according the present invention can handle stationary signals, linearly changing signals (or exponentially changing signals), as well as, with a modest level of distortion, such non-linearly changing signals where the rate of non-linear change is slow.

As noted above, it is one of the primary approaches of the present invention to assume that the (normalized) rate of change is constant in a short window, but the presented method and concept can be readily extended to a more general case. For example, the normalized rate of change, the variation, can be modeled by any function, and as long as the variation model (or said function) has less parameters than the number of data points, the model parameters can be unambiguously solved.

In the embodiments, the variation model may, for example, describe a smooth change of a signal characteristic. For example, the model may be based on the assumption that a signal characteristic (or a normalized rate of change thereof) follows a scaled version of an elementary function, or a scaled combination of elementary functions (wherein elementary functions comprise: $x^a$; $1/x^a$; $\sqrt{(x)}$; $1/x$; $1/x^2$; $e^x$; $a^x$; $\ln(x)$; $\log_a(x)$; sin h x; cos h x; tan h x; cot h x; ar sin h x; ar cos h x; ar tan h x; ar cot h x; sin x; cos x; tan x; cot x; sec x; csc x; arc sin x; arc cos x; arc tan x; arc cot x). In some embodiments, it is advantageous that the function describing the temporal evolution of the signal characteristic, or of the normalized rate of change, is steady and smooth over the range of interest.

Applicability in Different Domains

One of the primary fields of application of the concept according to the present invention is analysis of signal characteristics where the magnitude of change, the variation, is more informative than the magnitude of this characteristic. For example, in terms of pitch this means that embodiments according to the invention are related to applications where one is more interested in the change in pitch, rather than the pitch magnitude.

If, however, in an application, one is more interested in the magnitude of a signal characteristic rather than its rate of change, one can still benefit from the concept according to the present invention. For example, if a priori information about signal characteristics is available, such as the valid range for rate of change, then the signal variation can be used as additional information in order to obtain accurate and robust time contours of the signal characteristic. For example, in terms of pitch, it is possible to estimate the pitch by conventional methods, frame by frame, and to use the pitch variation to weed out estimation errors, out-liers, octave jumps and assist in making the pitch contour a continuous track rather than isolated points at the center of each analysis window. In other words, it is possible to combine the model parameter, parameterizing the transform-domain variation model, and describing the variation of a signal characteristic, with one or more discrete values describing a snapshot value of a signal characteristic.

Moreover, in an embodiment according to the invention it is a primary approach to model the normalized magnitude of change, since the magnitude of the signal characteristics is then explicitly cancelled from the calculations. Generally, this approach makes the mathematical formulations more tractable. However, embodiments according to the invention are not constrained to using normalized measures of variation, because there is no inherent reason why one should constrain the concept to normalized measures of variation.

Mathematical Variation Model

In the following, a mathematical variation model will be described which may be applied in some embodiments according to the invention. However, other variation models are naturally also usable.

Consider a signal with a property such as pitch, that varies over time and denote it by p(t). The change in pitch is its derivative $$\frac{\partial}{\partial t}p(t)$$

and in order to cancel the effect of the pitch magnitude, we normalize the change with $p^{-1}(t)$ and define $$c(t) = p^{-1}(t)\frac{\partial}{\partial t}p(t). \quad (1)$$

We call this measure c(t) the normalized pitch variation, or simply pitch variation, since a non-normalized measure of pitch variation is meaningless in the present example.

The period length T(t) of a signal is inversely proportional to the pitch, $T(t)=p^{-1}(t)$, whereby we can readily obtain $$c(t) = -T^{-1}(t)\frac{\partial}{\partial t}T(t).$$

By assuming that the pitch variation is constant in a small interval of t, c(t)=c, the partial differential equation of Equation 1 can be readily solved whereby we obtain $$p(t)=p_0e^{ct} \quad (2)$$

and $$T(t)=T_0e^{-ct}$$

where $p_0$ and $T_0$ signify, respectively, the pitch and period length at time t=0.

While T(t) is the period length at time t, we realize that any temporal feature follows the same formula. In particular, for the autocorrelation R(k,t) lag k at time t, the temporal features in the k-domain follow this formula. In other words, a feature of the autocorrelation that appears at lag $k_o$ at t=0 will be shifted as a function of t as $$k(t)=k_0e^{-ct}. \quad (3)$$

Similarly, we have $$c = -k^{-1}(t)\frac{\partial}{\partial t}k(t). \quad (4)$$

In Equation 2, we considered only variations that can be assumed constant in a short interval. However, if desired, we can use higher order models by allowing the variation to follow some functional form in a short temporal interval. Polynomials are in this case of special interest since the resulting differential equation can be readily solved. For example, if we define the variation to follow the polynomial form $$c(t) = \sum_{k=1}^{M} kc_k t^{k-1} = p^{-1}(t)\frac{\partial}{\partial t}p(t)$$

then $$p(t) = \exp\left(\sum_{k=0}^{M} c_k t^k\right).$$

Note that now, the constant $p_o$ appearing in Equation 2 has been assimilated into the exponential without loss of generality, in order to make the presentation clearer.

This form demonstrates how the variation model can readily be extended to more complicated cases. However, unless otherwise stated, in this document we will consider only the first order case (constant variation), in order to retain understandability and accessibility. Those familiar with the art can readily extend the methods to higher order cases.

The same approach used here to pitch variation modeling can be used without modification also to other measures for which the normalized derivative is a well-warranted domain. For example, the temporal envelope of a signal, which corresponds to the instantaneous energy of the signal's Hilbert transform, is such a measure. Often, the magnitude of the temporal envelope is of less importance than the relative value, that is the temporal variation of the envelope. In audio coding, modeling of the temporal envelope is useful in diminishing temporal noise spreading and is usually achieved by a method known as Temporal Noise Shaping (TNS), where the temporal envelope is modeled by a linear predictive model in the frequency domain (see, for example, reference [4]). The current invention provides an alternative to TNS for modeling and estimating the temporal envelope.

If we denote the temporal envelope by a(t), then the (normalized) envelope variation h(t) is $$h(t) = \sum_{k=1}^{M} kh_k t^{k-1} = a^{-1}(t)\frac{\partial}{\partial t}a(t) \quad (5)$$

and, correspondingly, the solution of the partial differential equation is $$a(t) = \exp\left(\sum_{k=0}^{M} h_k t^k\right).$$

Note that the above form implies that in the logarithmic domain, the amplitude is a simple polynomial. This is convenient since amplitudes are often expressed on the decibel scale (dB).

Generic Embodiment of an Apparatus for Obtaining a Parameter Describing a Temporal Variation of a Signal Characteristic FIG. 1 shows a block schematic diagram of an apparatus for obtaining a parameter describing a temporal variation of a signal characteristic of an audio signal on the basis of actual transform-domain parameters (e.g. autocorrelation values, autocovariance values, Fourier coefficients, and so on) describing the audio signal in a transform domain. The apparatus shown in FIG. 1*a* is designated in its entirety with 100. The apparatus 100 is configured to obtain (e.g. receive or compute) actual transform-domain parameters 120 describing the audio signal in a transform domain. Also, the apparatus 100 is configured to provide one or more model parameters 140 of a transform-domain variation model describing a temporal evolution of transform-domain parameters in dependence on one or more model parameters. The apparatus 100 comprises an optional transformer 110 configured to provide the actual transform-domain parameters 120 on the basis of a time-domain representation 118 of the audio signal, such that the actual transform-domain parameters 120 describe the audio signal in a transform domain. However, the apparatus 100 may alternatively be configured to receive the actual transform-domain parameters 120 from an external source of transform-domain parameters.

The apparatus 100 further comprises a parameter determinator 130, wherein the parameter determinator 130 is configured to determine one or more model parameters of the transform-domain variation model, such that a model error, representing a deviation between a modeled temporal evolution of the transform-domain parameters and an actual temporal evolution of the actual transform-domain parameters, is brought below a predetermined threshold value or minimized. Thus, the transform-domain variation model, describing a temporal evolution of transform-domain parameters in dependence on one or more model parameters representing a signal characteristic, is adapted (or fit) to the audio signal, represented by the actual transform-domain parameters. Thus, it is effectively achieved that a modeled variation of the audio-signal transform-domain parameters described, implicitly or explicitly, by the transform-domain variation model, approximates (within a predetermined tolerance range) the actual variation of the transform-domain parameters.

Many different implementation concepts are available for the parameter determinator. For example, the parameter determinator may comprise, for example, stored therein (or on an external data carrier) variation model parameter calculation equations 130*a* describing a mapping transform domain parameters onto variation model parameters. In this case, the parameter determinator 130 may also comprise a variation model parameter calculator 130*b* (for example a programmable computer or a signal processor or an fpga), which may be configured, for example hardware or software, to evaluate the variation model parameter calculation equations 130*a*. For example, the variation model parameter calculator 130*b* may be configured to receive a plurality of actual transform-domain parameters describing the audio signal in a transform domain and to compute, using the variation model parameter calculation equations 130*a*, the one or more model parameters 140. The variation model parameter calculation equations 130*a* may, for example, describe in explicit form a mapping of the actual transform-domain parameters 120 onto the one or more model parameters 140.

Alternatively, the parameter determinator 130 may, for example, perform an iterative optimization. For this purpose, the parameter determinator 130 may comprise a representation 130*c* of the time-domain variation model, which allows, for example, for a computation of a subsequent set of estimated transform-domain parameters on the basis of a previous set of actual transform-domain parameters (representing the audio signal), taking into consideration a model parameter describing the assumed temporal evolution. In this case, the parameter determinator 130 may also comprise a model parameter optimizer 130*d*, wherein the model parameter optimizer 130*d* may be configured to modify the one or more model parameters of the time-domain variation model 130*c*, until the set of estimated transform-domain parameters obtained by the parameterized time-domain variation model 130*c*, using a previous set of actual transform-domain parameters, is in sufficiently good agreement (for example within a predetermined difference threshold) with the current actual transform-domain parameters.

However, there are naturally numerous other methods for determining the one or more model parameters 140 on the basis of the actual transform-domain parameters, because there are different mathematical formulations of the solution for the general problem to determine model parameters such that the result of the modeling approximates the actual transform-domain parameters (and/or their temporal evolution).

Figure 1B:
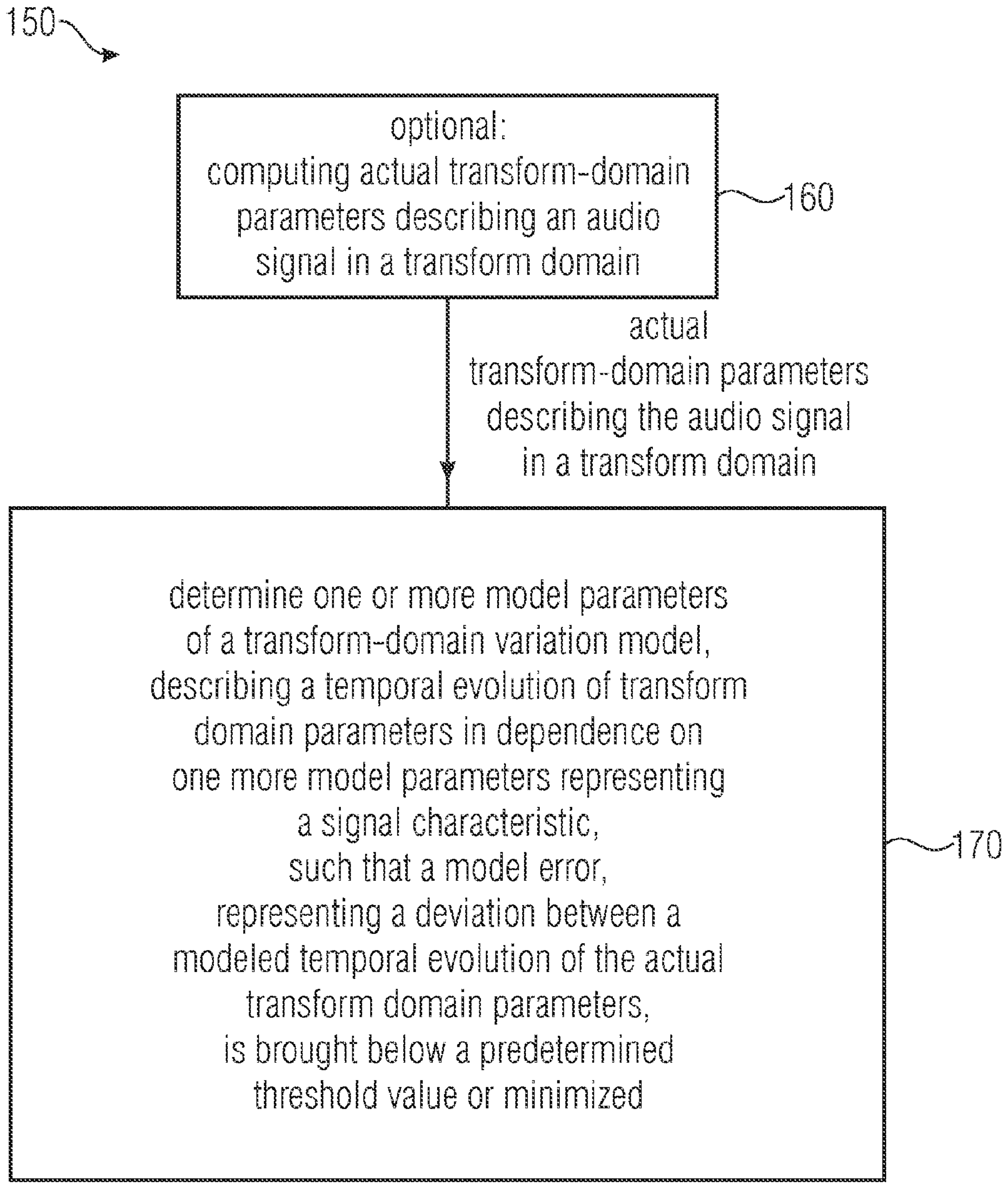
FIG. 1*b* shows a flow chart of a method for obtaining a parameter describing a temporal variation of a signal characteristic of an audio signal.

In view of the above discussion, the functionality of the apparatus 100 can be explained taking reference to FIG. 1*b*, which shows a flow chart of a method 150 for obtaining the parameter 140 describing a temporal variation of a signal characteristic of an audio signal. The method 150 comprises an optional step 160 of computing the actual transform-domain parameters 120 describing the audio signal in a transform domain. The method 150 also comprises a step 170 of determining the one or more model parameters 140 of a transform-domain variation model describing a temporal evolution of transform-domain parameters in dependence on one or more model parameters representing a signal characteristic, such that a model error, representing a deviation between a modeled temporal evolution and the actual transform-domain parameters, is brought below a predetermined threshold value or minimized.

In the following, some embodiments according to the invention will be described in more detail in order to explain in more detail the inventive concept.

Variation Estimation in the Autocorrelation Domain

In the current context, the autocorrelation of signal $x_n$ is defined as $$r_k=E[x_n x_{n+k}]$$

and estimated by $$r_k \approx \frac{1}{N}\sum_{n=1}^{N-k} x_n x_{n+k}$$

where we assume that x, is non-zero only on the range [1,N]. Note that the estimate converges to the true value when N goes to infinity. Moreover, generally, some sort of windowing may be applied to $x_n$ priori to estimation of the autocorrelation in order to enforce the assumption that it is zero outside the range [1,N].

Variation Estimation in the Autocorrelation Domain—Pitch Variation

In an embodiment, our objective is to estimate signal variation, that is, in the case of pitch variation, to estimate how much the autocorrelation stretches or shrinks as a function of time. In other words, our objective is to determine the time derivative of the autocorrelation lag k, which is denoted as $$\frac{\partial k}{\partial t}.$$

In the interest of clearness, we now use the short hand form k instead of k(t) and assume that the dependence on t is implicit.

From Equation 4 we obtain $$\frac{\partial k}{\partial t} = -ck.$$

A conventional problem, which is overcome in some embodiments according to the invention, is that the time derivative of k is not available and direct estimation is difficult. However, it has been recognized that the chain rule of derivatives can be used to obtain $$\frac{\partial k}{\partial t}=\left[\frac{\partial R}{\partial t}\right]\left[\frac{\partial k}{\partial R}\right]=\left[\frac{\partial R}{\partial t}\right]\left[\frac{\partial R}{\partial k}\right]^{-1} \tag{6}$$

and $$\left[\frac{\partial R}{\partial t}\right]=\left[\frac{\partial k}{\partial t}\right]\left[\frac{\partial R}{\partial k}\right]=-ck\left[\frac{\partial R}{\partial k}\right].$$

It has been found, that using an estimate of c, we can then, using first order Taylor series, model the autocorrelation at time $t_2$ using the autocorrelation at time $t_1$ and the time derivative $$\hat{R}(k,t_2)=R(k,t_1)+\Delta t\frac{\partial R}{\partial t}=R(k,t_1)-c\Delta tk\left[\frac{\partial R}{\partial k}\right]$$

In a practical application the derivative $$\frac{\partial}{\partial k}R(k)$$

can be estimated, for example, by the second order estimate $$\frac{\partial}{\partial k}R(k)=\frac{1}{2}[R(k+1)-R(k-1)].$$

This estimate is advantageous over the first order difference R(k+1)−R(k) since the second order estimate does not suffer from the half-sample phase shift like the first order estimate. For improved accuracy or computational efficiency, alternative estimates can be used, such as windowed segments of the derivative of the sinc-function.

Using the minimum mean square error criterion we obtain the optimization problem $$\min_c\sum_{k=1}^{N}\left[R(k,t_2)-\hat{R}(k,t_2)\right]^2 \tag{7}$$

whose solution can readily be obtained as $$\hat{c}=\frac{\sum_{k=1}^{N}[R(k,t_2)-R(k,t_1)]k\frac{\partial R}{\partial k}}{\Delta t\sum_{k=1}^{N}k^2\left(\frac{\partial R}{\partial k}\right)^2}. \tag{8}$$

The same derivations hold also when the pitch variation is estimated from consecutive autocovariance windows instead of the autocorrelation. However, in comparison to the autocorrelation, the autocovariance contains additional information the usage of which is described in the section titled "Modeling in the Autocovariance domain".

Variation Estimation in the Autocorrelation Domain —Temporal Envelope

As will be described in the following, a temporal evolution of the envelope can also be estimated in the autocorrelation domain.

In the following, a brief overview of the determination of the temporal envelope variation will be given taking reference to FIG. 2. Subsequently, a possible algorithm, according to an embodiment of the invention, will be described in detail.

Figure 2:
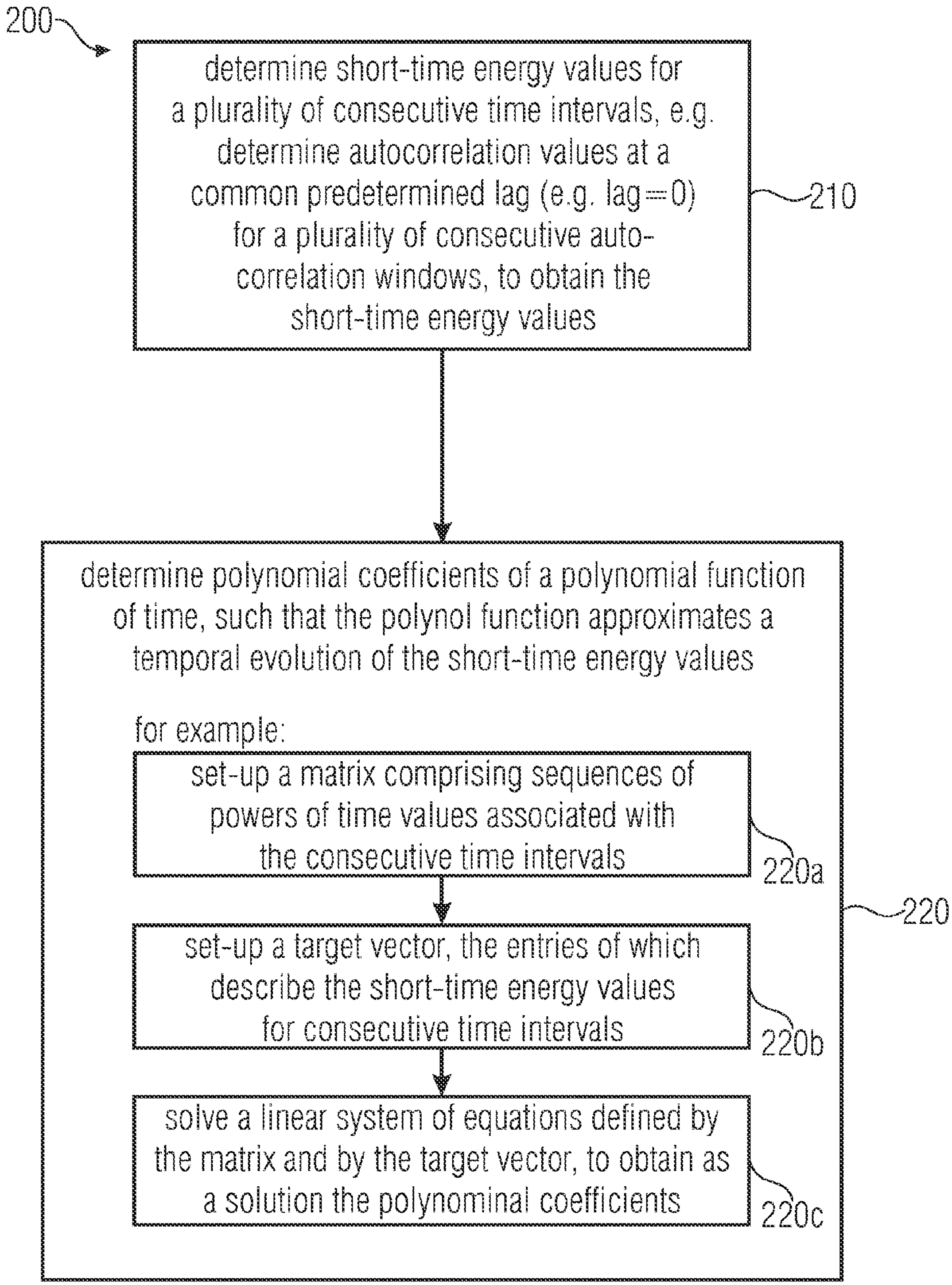
FIG. 2 shows a flow chart of a method for obtaining a parameter describing a temporal evolution of a signal envelope, according to an embodiment of the invention.

FIG. 2 shows a flow chart of a method for obtaining a parameter describing a temporal variation of an envelope of the audio signal. The method shown in FIG. 2 is designated in its entirety with 200. The method 200 comprises determining 210 short-time energy values for a plurality of consecutive time intervals. Determining the short-time energy values may, for example, comprise determining autocorrelation values at a common predetermined lag (e.g. lag 0) for a plurality of consecutive (temporally overlapping or temporally non-overlapping) autocorrelation windows, to obtain the short-time energy values. A step 220 further comprises determining appropriate model parameters. For example, step 220 may comprise determining polynomial coefficients of a polynomial function of time, such that the polynomial function approximates a temporal evolution of the short-time energy values. In the following, an example algorithm for determining the polynomial coefficients will be described. For example, the step 220 may comprise a step 220*a* of setting-up a matrix (e.g. designated with V) comprising sequences of powers of time values associated with consecutive time intervals (time intervals beginning or being centered, for example, at times $t_0$, $t_1$, $t_2$, and so on). The step 220 may also comprise of step 220*b* of setting-up a target vector (e.g. designated with r) the entries of which describe the short-time energy values for the consecutive time intervals.

In addition, the step 220 may comprise a step 220*c* of solving a linear system of equations (for example, of the form r=Vh) defined by the matrix (e.g. designated with V) and by the target vector (e.g. designated with r), to obtain as a solution the polynomial coefficients (e.g. described by vector h).

In the following, additional details regarding this procedure will be explained.

In the autocorrelation domain, modeling of the temporal envelope is straightforward. We can readily prove that the autocorrelation at lag zero corresponds to the average of the squared amplitude. Furthermore, the autocorrelation at all other lags is scaled by the average of the squared amplitude. In other words, the same information is available at any and all lags, whereby it is sufficient to consider the autocorrelation at lag zero only.

Since the first order model of envelope variation is trivial, a higher order model is used in an embodiment. This also serves as an example of how to proceed with higher order models, also in the case of pitch variation estimation.

Consider an Mth order polynomial model for the envelope variation according to Equation 5. We then have M+1 unknowns and it is thus advantageous to use at least M+1 equations for a solution. In other words, it is advantageous to use at least M+1 consecutive autocorrelation windows (designated, for example, by autocorrelation window center time or autocorrelation window start time $t_h$, $R(k,t_h)$, $h\in[0,N]$ and $N\geq M$). Then, the value of a(t) (describing, for example, a short-term average power or short-term average amplitude, for example in a linear or non-linear scaling) at N+1 different times $t=t_h$ (or for N+1 different overlapping or non-overlapping time intervals) is obtained, that is a $(t_h)=R(0,t_h)^{1/2}$ and $$\frac{1}{2}\ln R(0, t_h) = \sum_{k=0}^{M} h_k t^k$$

Since a(t) is a polynomial (more precisely: is approximated by a polynomial), this is the classical problem of solving the coefficients of a polynomial, for which numerous methods exist in literature.

One basic alternative for solution is to use a Vandermonde matrix as follows.

The Vandermonde matrix V is, for example, defined as $$V = \begin{bmatrix} 1 & t_0 & t_0^2 & \dots & t_0^M \\ 1 & t_1 & t_1^2 & \dots & t_1^M \\ \vdots & \vdots & & \vdots & \\ 1 & t_N & t_N^2 & \dots & t_N^M \end{bmatrix},$$

and may be computed, for example, in step 220*a*. A target vector r and a solution vector h may be defined as $$r = \begin{bmatrix} \frac{1}{2}\ln R(0, t_0)^{1/2} \\ \frac{1}{2}\ln R(0, t_1)^{1/2} \\ \vdots \\ \frac{1}{2}\ln R(0, t_N)^{1/2} \end{bmatrix}$$

$$h = \begin{bmatrix} h_0 \\ h_1 \\ \vdots \\ h_N \end{bmatrix},$$

The target vector may, for example, be computed in step 220*b*.

Then $$r = Vh.$$

Since the $t_h$'s are distinct and if M=N, then the inverse $V^{-1}$ exists and we obtain $$h = V^{-1} r,$$

for example in step 220*c*.

If M>N, then the pseudo-inverse yields the answer. However, if N and M are large, then more refined methods known in the art may be employed for efficient solution.

Variation Estimation in the Autocorrelation Domain—Bias Analysis

While the above presented estimate measures variation, there is one step where the locally-stationary assumption is not overcome in some embodiments. Namely, estimation of the autocorrelation by conventional means (e.g. using an autocorrelation window of finite length) makes the assumption that the signal should be locally stationary. In the following, it will be shown that signal variation does not introduce bias to the estimate, such that the method can be considered as sufficiently accurate.

In order to analyze bias of the autocorrelation, assume that the pitch variation is constant in this time interval. Furthermore, assume that at $t_0$ we have a signal x(t) with period length $T(t_0)=T_0$, then at a second point $t_1$ it has period length $T(t_1)=T_0\exp(-c(t_1-t_0))$. The average period length on the interval $[t_0,t_1]$ is $$\begin{aligned} \hat{T}_{t_0,t_1} &= \frac{1}{t_1 - t_0}\int_{t_0}^{t_1} T(t)dt \\ &= \frac{1}{t_1 - t_0}\int_{t_0}^{t_1} T_0 e^{-c(t-t_0)}dt \\ &= -\frac{T_0}{c(t_1 - t_0)}(e^{-c(t_1-t_0)} - 1) \\ &= T_0 e^{-c\frac{t_1-t_0}{2}} \frac{\sinh c\frac{t_1-t_0}{2}}{c\frac{t_1-t_0}{2}}. \end{aligned}$$

Observe that the latter part of the expression above is a "hyperbolic sinc" function, which we will denote by $$\operatorname{sinc}h(x) = \frac{\sinh(x)}{x} = \frac{e^x - e^{-x}}{2x}.$$

Then for a window of length $\Delta t_{win}=t_1-t_0$ we have $$\hat{T}_{\Delta t_{win}} = T_0 e^{-c\frac{\Delta t_{win}}{2}} \operatorname{sinc}h\left(c\frac{\Delta t_{win}}{2}\right). \tag{9}$$

By analogy between T and k, this expression also quantifies how much an autocorrelation estimate is stretched due to signal variation. However, if windowing is applied prior to autocorrelation estimation, the bias due to signal variation is reduced, since the estimate then concentrates around the midpoint of the analysis window.

When estimating c from two consecutive biased autocorrelation frames the values of k for each frame are biased and follow the formulae $$\begin{cases} k(\hat{t}_1) = k_0 e^{-c\hat{t}_1}\operatorname{sinc}h(c\Delta t_{win}/2) \\ k(\hat{t}_2) = k_0 e^{-c\hat{t}_2}\operatorname{sinc}h(c\Delta t_{win}/2) \end{cases}$$

where $\hat{t}_1$ and $\hat{t}_2$ are the mid-points of each of the frames.

Parameter c can be solved by defining $\hat{t}_1=0$ and the distance between windows $\Delta t_{step}=\hat{t}_2-\hat{t}_1$, whereby $$c = \frac{\ln k(\hat{t}_1) - \ln k(\hat{t}_2)}{\Delta t_{step}}$$

where we observe that all instances of $\Delta t_{win}$ have cancelled each other out. In other words, even though signal variation biases the autocorrelation estimate, the variation estimate extracted from two autocorrelations is unbiased.

However, while signal variation does not bias the variation estimate, estimation errors due to overtly short analysis windows cannot be avoided. Estimation of the autocorrelation from a short analysis window is prone to errors, since it depends on the location of the analysis window with respect to the signal phase. Longer analysis windows reduce this type of estimation errors but in order to retain the assumption of locally constant variation, a compromise has to be sought. A generally accepted choice in the art is to have an analysis window length at least twice the lowest expected period length. Nevertheless, shorter analysis windows may be used if an increased error is acceptable.

In terms of temporal envelope variation, the results are similar. For a first order model, the estimate for envelope variation is unbiased. Moreover, exactly the same logic can be applied to autocovariance estimates, whereby the same result holds for the autocovariance.

Variation Estimation in the Autocorrelation Domain—Application

In the following, a possible application of the present invention for the estimation of a pitch variation will be described. Firstly, the general concept will be outlined taking reference to FIG. 3, which shows a flow chart of a method 300 for obtaining a parameter describing a temporal variation of a pitch of an audio signal, according to an embodiment of the invention. Subsequently, implementation details of the said method 300 will be given.

The method 300 shown in FIG. 3 comprises, as an optional first step, performing 310 an audio signal pre-processing of an input audio signal. The audio pre-processing may comprise, for example, a pre-processing which facilitates an extraction of the desired audio signal characteristics, for example, by reducing any detrimental signal components. For example, the formant structure modeling described below may be applied as an audio signal pre-processing step 310.

The method 300 also comprises a step 320 of determining a first set of autocorrelation values $R(k,t_1)$ of an audio signal $x_n$ for a first time or time interval $t_1$ and for a plurality of different autocorrelation lag values k. For a definition of the autocorrelation values, reference is made to the description below.

The method 300 also comprises a step 322 of determining a second set of autocorrelation values $R(k,t_2)$ of the audio signal $x_n$ for a second time or time interval $t_2$ and for a plurality of different autocorrelation lag values k. Accordingly, steps 320 and 322 of the method 300 may provide pairs of autocorrelation values, each pair of autocorrelation values comprising two autocorrelation (result) values associated with different time intervals of the audio signal but same autocorrelation lag value k. The method 300 also comprises a step 330 of determining a partial derivative of the autocorrelation over autocorrelation lag, for example, for the first time interval starting at $t_1$ or for the second time interval starting at $t_2$. Alternatively, the partial derivative over autocorrelation lag may also be computed for a different instance in time or time interval lying or extending between time $t_1$ and time $t_2$.

Accordingly, the variation of the autocorrelation R(k,t) over autocorrelation lag can be determined for a plurality of the different autocorrelation lag values k, for example, for those autocorrelation lag values for which the first set of autocorrelation values and second set of autocorrelation values are determined in steps 320, 322.

Naturally, there is no fixed temporal order with respect to the execution of steps 320, 322, 330, such that the steps can be executed partially or completely in parallel, or in a different order.

The method 300 also comprises a step 340 of determining one or more model parameters of a variation model using the first set of autocorrelation values, the second set of autocorrelation values and the partial derivative of the autocorrelation $$\frac{\partial}{\partial k}R(k,t)$$

over autocorrelation lag.

When determining the one or more model parameters, a temporal variation between autocorrelation values of a pair of autocorrelation values (as described above) may be taken into consideration. The difference between the two autocorrelation values of the pair of autocorrelation values may be weighted, for example, in dependence on the variation of the autocorrelation over lag $$\left(\frac{\partial}{\partial k}R(k,h)\right).$$

In the weighting of a difference between two autocorrelation values of a pair of autocorrelation values, the autocorrelation lag value k (associated with the pair of autocorrelation values) may also be considered as a weighting factor. Accordingly, a sum term of the form $$[R(k,h+1)-R(k,h)]k\frac{\partial}{\partial k}R(k,h)$$

may be used for the determination of the one or more model parameters, wherein said sum term may be associated to a given autocorrelation lag value k and wherein the sum term comprises a product of a difference between two autocorrelation values of a pair of autocorrelation values of the form $$R(k,h+1)-R(k,h),$$

and a lag-dependent weighting factor, for example of the form $$k\frac{\partial}{\partial k}R(k,h).$$

The autocorrelation lag dependent weighting factor allows for a consideration of the fact that the autocorrelation is extended more intensively for larger autocorrelation lag values than for small autocorrelation lag values, because the autocorrelation lag value factor k is included. Further, the incorporation of the variation of the autocorrelation value over lag makes it possible to estimate the expansion or compression of the autocorrelation function on the basis of local (equal autocorrelation lag) pairs of autocorrelation values. Thus, the expansion or compression of the autocorrelation function (over lag) can be estimated without conducting a pattern scaling and match functionality. Rather, the individual sum terms are based on local (single lag value k) contributions R(k,h+1), R(k,h), $$\frac{\partial}{\partial k}R(k,h).$$

Nevertheless, in order to obtain a large amount of information from the autocorrelation function, sum terms associated with different lag values k may be combined, wherein the individual sum terms are still single-lag-value sum terms.

In addition, normalization may be performed when determining the model parameters of the variation model, wherein the normalization factor may, for example, take the form $$\Delta t_{step}\sum_{k=1}^{N} k^2\left[\frac{\partial}{\partial k}R(k, h)\right]^2$$

and may, for example, comprise a sum of single-autocorrelation-lag-value terms.

In other words, the determination of the one or more model parameters may comprise a comparison (e.g. difference formation or subtraction) of autocorrelation values for a given, common autocorrelation lag value but for different time intervals and, for the computation of the variation of the autocorrelation value over lag (k-derivative of autocorrelation), a comparison of autocorrelation values for a given, common time interval but for different autocorrelation lag values. However, a comparison (or subtraction) of autocorrelation values for different time intervals and for different autocorrelation lag values, which would bring along considerable effort, is avoided.

The method 300 may further, optionally, comprise a step 350 of computing a parameter contour, such as a temporal pitch contour, on the basis of the one or more model parameters determined in the step 340.

Figure 3A:
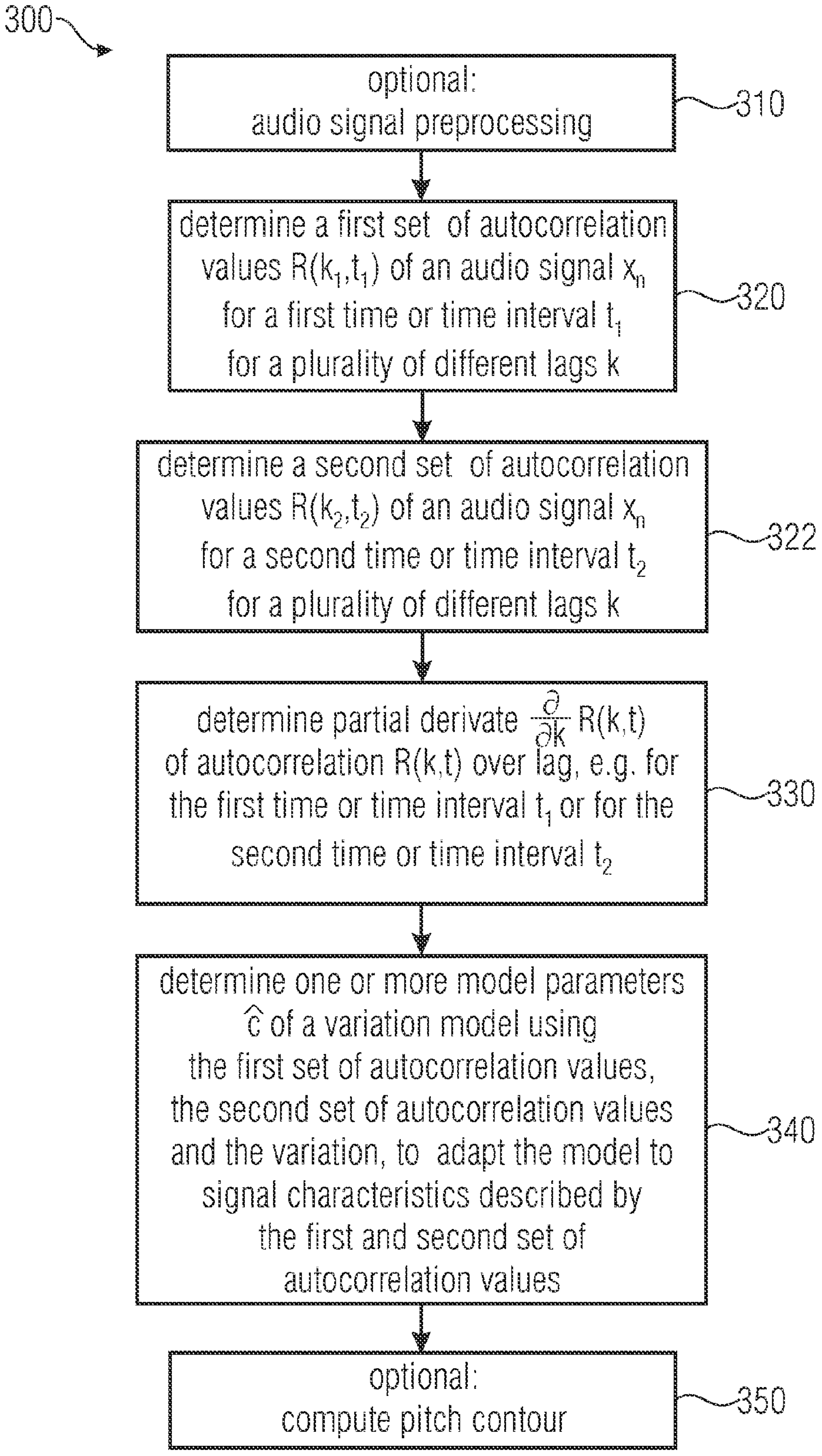
FIG. 3*a* shows a flow chart of a method for obtaining a parameter describing a temporal variation of a pitch, according to an embodiment of the invention.

In the following, a possible implementation of the concept described with reference to FIG. 3*a* will be explained in detail.

Figure 3B:
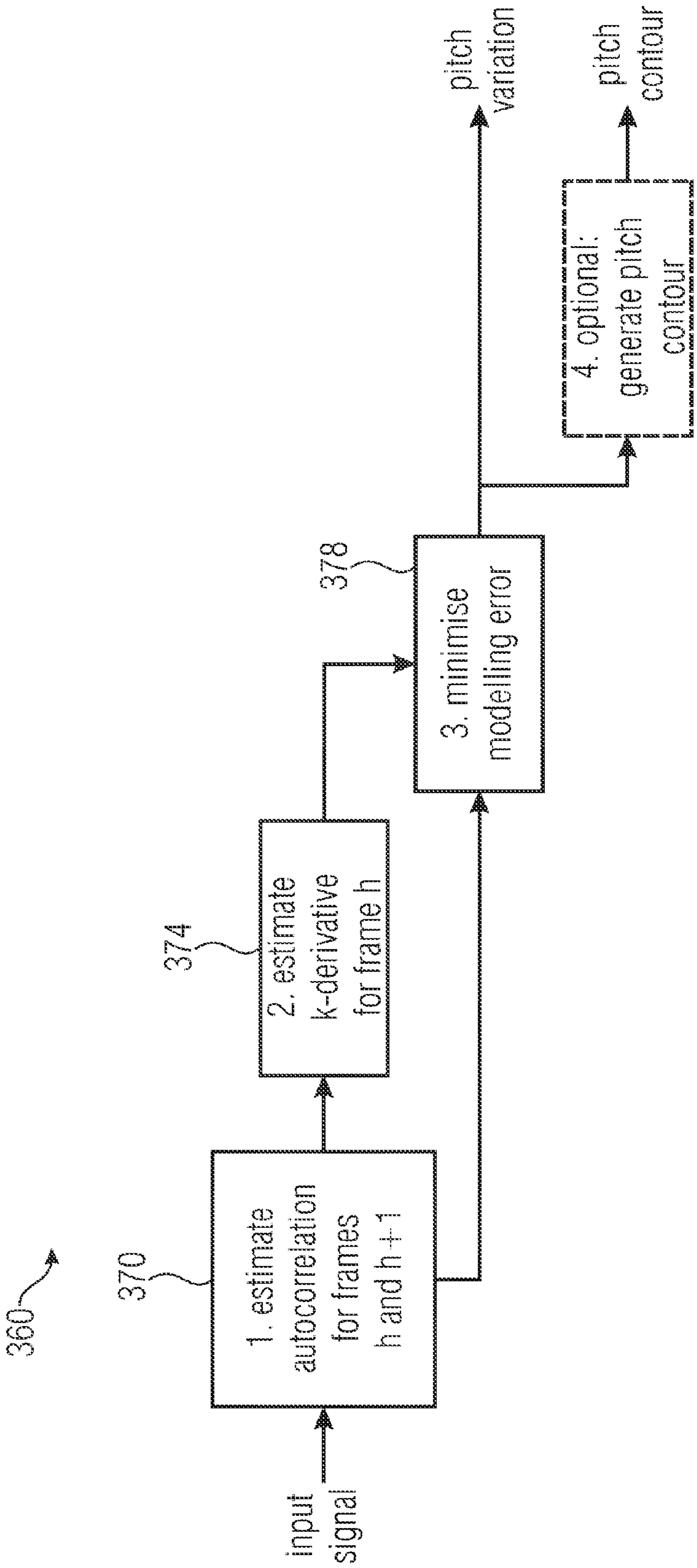
FIG. 3*b* shows a simplified flow chart of the method for obtaining a parameter describing the temporal evolution of the pitch.

As a concrete application of the present innovation, we shall in the following demonstrate an embodiment of a method of estimating pitch variation from a temporal signal in the autocorrelation domain. The method (360), which is schematically represented in FIG. 3*b*, comprises (or consists of) the following steps:

1. Estimate (320,322;370) the autocorrelation R(k,h) of $x_n$ for window h and h+1 (for example windowed by windowing function $w_n$) of length $\Delta t_{win}$, separated by $\Delta t_{step}$ $$\hat{x}_{n,h} = w_n x_{n+h\Delta t_{step}}$$

$$R(k, h) = \sum_{n=1}^{\Delta t_{win}-k} \hat{x}_{n,h}\hat{x}_{n+k,h}$$

2. Estimate (330;374) k-derivative of autocorrelation for window (or "frame") h, for example by $$\frac{\partial}{\partial k}R(k, h) = \frac{1}{2}[R(k+1, h) - R(k-1, h)]$$

3. Estimate (340;378) pitch variation $c_h$ between windows or frames h and h+1 using (from Eq. 8)

$$\hat{c}_h = \frac{\sum_{k=1}^{N}[R(k, h+1) - R(k, h)]k\frac{\partial}{\partial k}R(k, h)}{\Delta t_{step}\sum_{k=1}^{N} k^2\left[\frac{\partial}{\partial k}R(k, h)\right]^2}.$$

If a (optionally normalized) pitch contour is desired instead of only the pitch variation measure $c_h$, a further step shall be added:

4. Let the mid-point of window or frame h be $t_h$. Then the pitch contour between windows or frames h and h+1 is $$p(t)=p(t_h)e^{c_h t} \text{ for } t \in (t_h, t_{h+1}]$$

where $p(t_h)$ is acquired from the previous pair of frames or actual estimates of pitch magnitude. If no measurements of the pitch magnitude are available, we can set p(0) to an arbitrarily chosen starting value, e.g. p(0)=1, and calculate pitch contour iteratively for all consecutive windows.

A number of pre-processing steps (310) known in the art can be used to improve the accuracy of the estimate. For example, speech signals have generally a fundamental frequency in the range 80 to 400 Hz and if it is desired to estimate the change in pitch, it is beneficial to band-pass filter the input signal for example on range of 80 to 1000 Hz so as to retain the fundamental and a few first harmonics, but attenuate high-frequency components that could degrade the quality especially of the derivative estimates and thus also the overall estimate.

Figure 7:
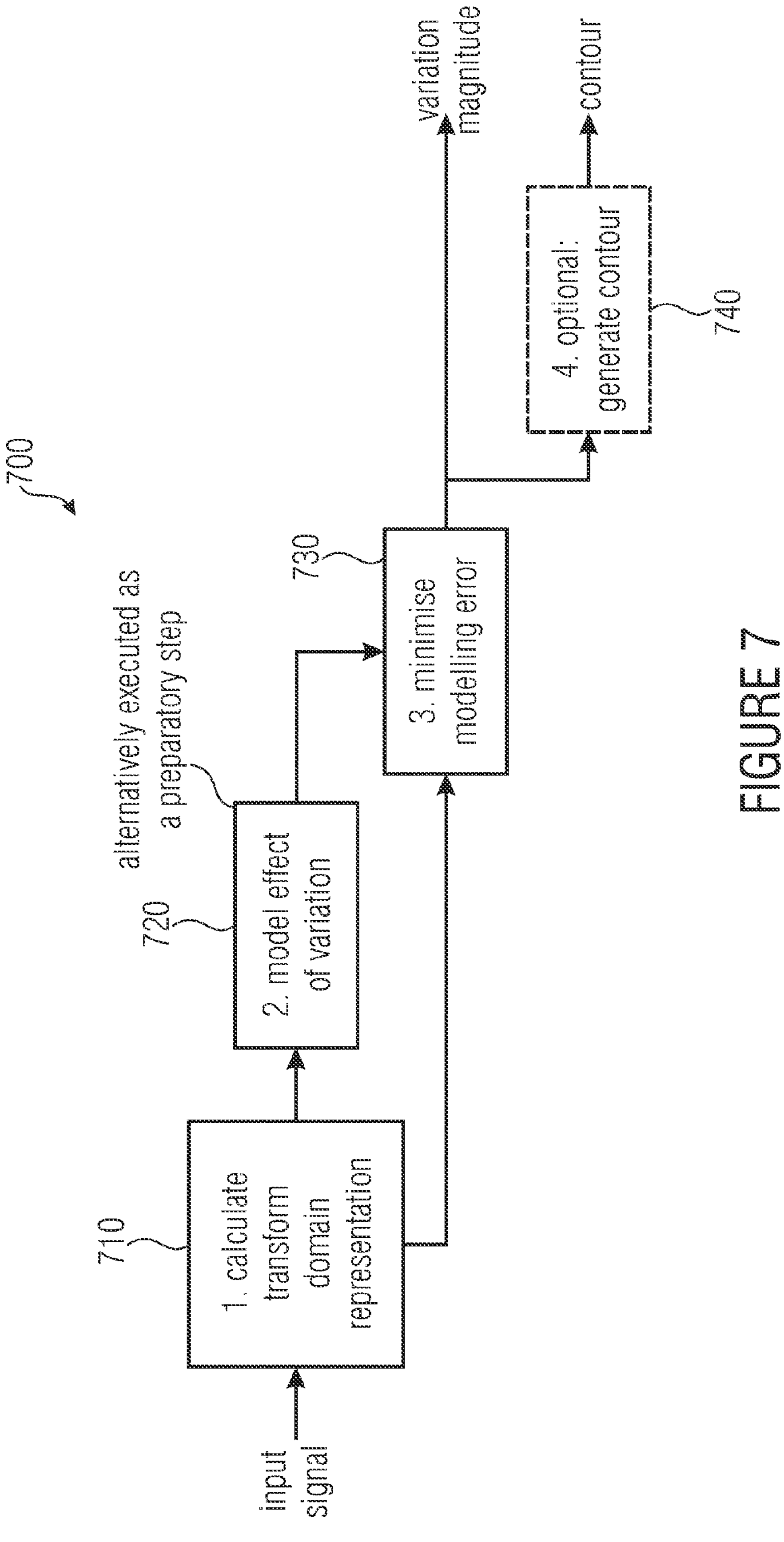
FIG. 7 shows a flow chart of a general method for obtaining a parameter describing a variation of a signal.

Above, the method is applied in the autocorrelation domain but the method can optionally, mutatis mutandis, be implemented in other domains such as the autocovariance domain. Similarly, above, the method is presented in application to pitch variation estimation, but the same approach can be used to estimate variations in other characteristics of the signal such as the magnitude of the temporal envelope. Moreover, the variation parameter(s) can be estimated from more than two windows for increased accuracy or, when the variation model formulation necessitates additional degrees of freedom. The general form of the presented method is depicted in FIG. 7.

If additional information is available regarding the properties of the input signal, thresholds can optionally be used to remove infeasible variation estimates. For example, the pitch (or pitch variation) of a speech signal rarely exceeds 15 octaves/second, whereby any estimate that exceeds this value is typically either non-speech or an estimation error, and can be ignored. Similarly, the minimum modeling error from Eq. 7 can optionally be used as an indicator of the quality of the estimate. Particularly, it is possible to set a threshold for the modeling error such that an estimate based on a model with large modeling error is ignored, since the change exhibited in the model is not well described by the model and the estimate itself is unreliable.

Variation Estimation in the Autocorrelation Domain—Formant Structure Modeling In the following, a concept will be described for an audio signal pre-processing, which can be used to improve the estimation of the characteristics (for example, of the pitch variation) of the audio signal.

In speech processing, formant structure is generally modeled by linear predictive (LP) models (see reference [6]) and its derivatives, such as warped linear prediction (WLP) (see reference [5]) or minimum variance distortionless response (MVDR) (see reference [9]). Furthermore, while speech is constantly changing, the formant model is usually interpolated in the Line Spectral Pair (LSP) domain (see reference [7]) or equivalently, in the Immittance Spectral Pair (ISP) domain (see reference [1]), to obtain smooth transitions between analysis windows.

For LP modeling of formants, however, the normalized variation is not of primary interest, since normalizing the LP model does not bring relevant advantages in some cases. Specifically, in speech processing, the location of formants is usually more important and interesting information than the change in their locations. Therefore, while it is possible to formulate normalized variation models for formants as well, we will focus on the more interesting topic of canceling the effect of formants.

In other words, inclusion of a model for changes in formants can be used to improve accuracy of the estimation of pitch variation or other characteristics. That is, by canceling the effect of changes in formant structure from the signal prior to the estimation of pitch variation, it is possible to reduce the chance that a change in formant structure is interpreted as a change in pitch. Both the formant location and pitch can change with up to roughly 15 octaves per second, which means that changes can be very rapid, they vary on roughly the same range and their contributions could be easily confused.

To optionally cancel the effect of formant structure, we first estimate an LP model for each frame, remove formant structure by filtering and use the filtered data in the pitch variation estimation. For pitch variation estimation, it is important that the autocorrelation has a low-pass character and it is therefore useful to estimate the LP model from a high-pass filtered signal, but cancel the formant structure only from the original signal (i.e. without high-pass filtering), whereby the filtered data will have a low-pass character. As is well known, the low-pass character makes it easier to estimate derivatives from the signal. The filtering process itself, can be performed in time-domain, autocorrelation domain or frequency domain, according to computational requirements of the application.

Specifically, the pre-processing method for canceling formant structure from the autocorrelation can be stated as 1. Filter the signal with a fixed high-pass filter.
2. Estimate LP models for each frame of the high-pass filtered signal.
3. Remove the contribution of the formant structure by filtering the original signal with the LP filter.

The fixed high-pass filter in Step 1, can optionally be replaced by a signal adaptive filter, such as a low-order LP model estimated for each frame, if a higher level of accuracy is necessitated. If low-pass filtering is used as a pre-processing step at another stage in the algorithm, this high-pass filtering step can be omitted, as long as the low-pass filtering appears after formant cancellation.

The LP estimation method in Step 2 can be freely chosen according to requirements of the application. Well-warranted choices would be, for example, conventional LP (see reference [6]), warped LP (see reference [5]) and MVDR (see reference [9]). Model order and method should be chosen so that the LP model does not model the fundamental frequency but only the spectral envelope.

In step 3, filtering of the signal with the LP filters can be performed either on a window-by-window basis or on the original continuous signal. If filtering the signal without windowing (i.e. filtering the continuous signal), it is useful to apply interpolation methods known in the art, such as LSP or ISP, to decrease sudden changes of signal characteristics at transitions between analysis windows.

Figure 4:
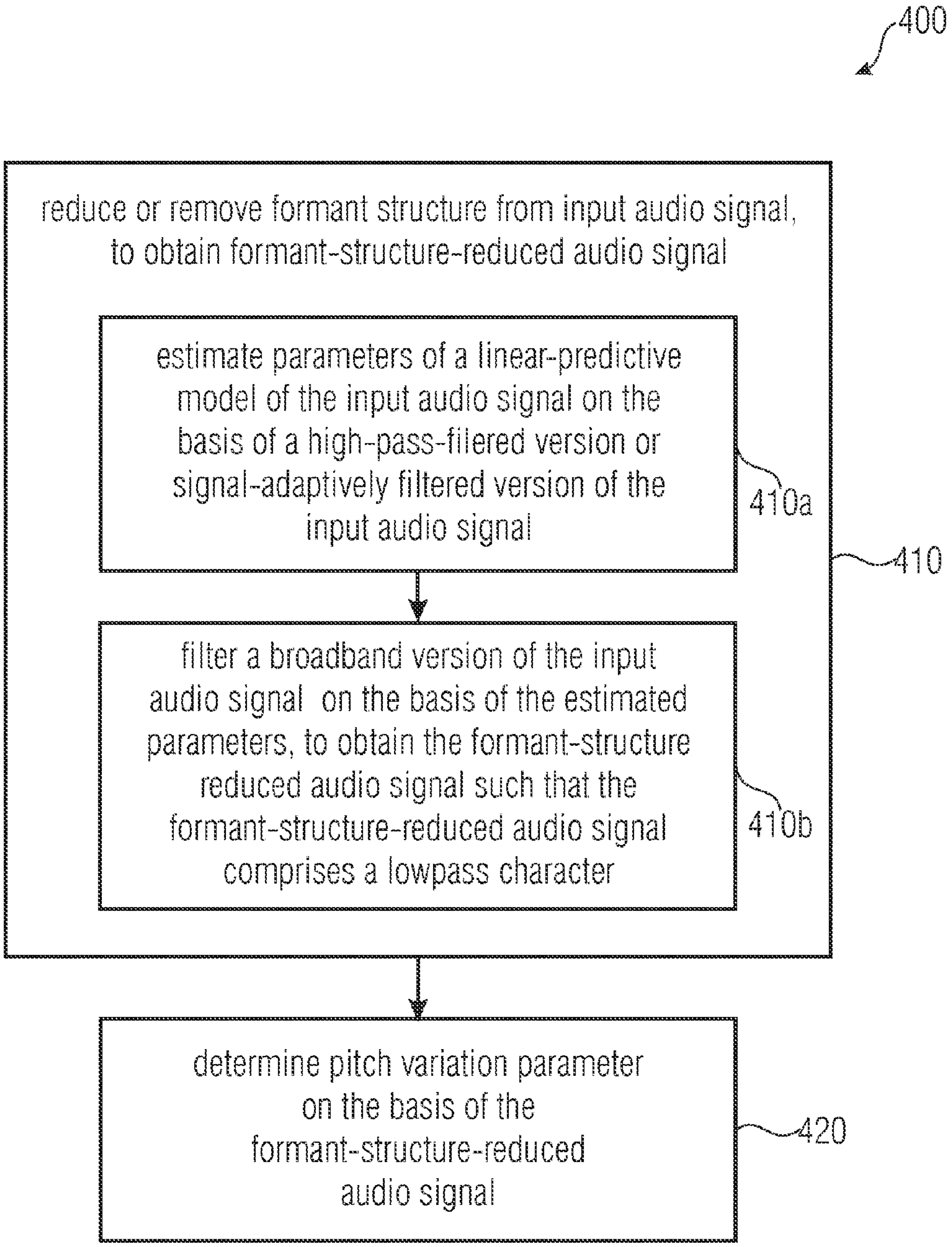
FIG. 4 shows a flow chart of a further improved method for obtaining a parameter describing a temporal variation of a pitch, according to an embodiment of the invention.

In the following, the process of formant structure removal (or reduction) will be briefly summarized taking reference to FIG. 4. The method 400, a flow chart of which is shown in FIG. 4, comprises a step 410 of reducing or removing a formant structure from an input audio signal, to obtain a formant-structure-reduced audio signal. The method 400 also comprises a step 420 of determining a pitch variation parameter on the basis of the formant-structure-reduced audio signal. Generally speaking, the step 410 of reducing or removing the formant structure comprises a sub-step 410*a* of estimating parameters of a linear-predictive model of the input audio signal on the basis of a high-pass-filtered version or signal-adaptively filtered version of the input audio signal. The step 410 also comprises a sub-step 410*b* of filtering a broadband version of the input audio signal on the basis of the estimated parameters, to obtain the formant-structure-reduced audio signal such that the formant-structure-reduced audio signal comprises a low-pass character.

Naturally, the method 400 can be modified, as described above, for example, if the input audio signal is already low-pass filtered.

Generally, it can be said that a reduction or removal of formant structure from the input audio signal can be used as an audio signal pre-processing in combination with an estimation of different parameters (e.g. pitch variation, envelope variation, and so on) and also in combination with a processing in different domains (e.g. autocorrelation domain, autocovariance domain, Fourier transformed domain, and so on).

Modeling in the Autocovariance Domain

Modeling in the Autocovariance Domain: Introduction and Overview

In the following, it will be described how model parameters representing a temporal variation of an audio signal can be estimated in an autocovariance domain. As mentioned above, different model parameters, like a pitch variation model parameter or an envelope variation model parameter, can be estimated.

The autocovariance is defined as $$Q(k) = \frac{1}{N}\sum_{n=1}^{N} x_n x_{n+k},$$

wherein $x_n$ designates samples of the input audio signal. Note that, in difference to the autocorrelation, here we do not assume that $x_n$ is non-zero only in the analysis interval. That is, $x_n$ does not need to be windowed before analysis. Like the autocorrelation, for a stationary signal the autocovariance converges to $E[x_n x_{n+k}]$ when $N=\infty$.

In comparison to autocorrelation, the autocovariance is a very similar domain, but with some additional information. Specifically, where as in the autocorrelation domain, phase information of the signal is discarded, in the covariance it is retained. When looking at stationary signals, we often find that phase information is not that useful, but for rapidly varying signals, it can be very useful. The underlying difference comes from the fact that for a stationary signal the expected value is independent of time $$E[x_n x_{n+k}]=E[x_n x_{n-k}]$$

but for a non-stationary signal this does not hold.

Assume at time t (or for a time interval starting at time t or being centered at time t) we estimate, for signal $x_n$, the autocovariance Q(k,t). Then we can readily see that it holds that E[Q(k,t)]=E[Q(−k,t+k]. In the following we will adapt a notation where the expectations (described by the operator E[ . . . ]) are implicit, whereby Q(k,t)=Q(−k,t+k). Similarly, the relationship Q(−k,t)=Q(k,t−k) may hold.

By applying the assumption of locally constant temporal envelope variation, we have $$E[x(t)]=e^{ht}E[x(0)]$$

and similarly $$Q(k,t)=e^{2ht}Q(k,0).$$

The time derivative of Q(k,t) is therefore $$\frac{\partial Q(k,t)}{\partial t}=2hQ(k,t). \tag{10}$$

Using these relations we can now form a first order Taylor estimate for Q(k,t) centered at t $$\begin{aligned}\hat{Q}(k,t) &= Q(-k,t+k)\\ &= Q(-k,t)+k\frac{\partial Q(-k,t)}{\partial t}\\ &= (1+2hk)Q(-k,t).\end{aligned}$$

For example, the time shift may be measured in the same units as the autocorrelation lag, such that the following may hold:

$$Q(-k,t+k=t+\Delta t)=Q(-k,t)+\Delta t\frac{\partial Q(-k,t)}{\partial t}.$$

Now all terms appear at the same point in time t (or for the same time interval), so we can define $q_k$=Q(k,t) and $\hat{q}_k=\hat{Q}$(k, t).

Recall that our purpose was to estimate the envelope variation h. Since the above relation holds for all k we can, for example, minimize the squared modeling error $$\min_h \sum_{k=-N}^{N}[q_k-\hat{q}_k]^2 \tag{11}$$

The minimum can be readily found as $$h=\frac{\sum_{k=-N}^{N}(q_k-2kq_{-k})q_{-k}}{2\sum_{k=-N}^{N}kq_{-k}^2}. \tag{12}$$

Here we have chosen to use minimum mean square error (MMSE) as our optimization criterion but any other criteria known in the art can be applied equally well here and also in the other embodiments. Likewise, we have chosen to take the estimate over all lags between k=−N and k=N, but a selection of indices can be used for benefit of computational efficiency and accuracy if desired here and also in the other embodiments.

Note that in comparison to the autocorrelation, with the autocovariance we do not need to use successive analysis windows, but we can estimate the temporal envelope variation from a single window. A similar approach can readily be developed for the estimation of pitch variation from a single autocovariance window.

Furthermore, note that in comparison to pitch variation estimation, for envelope estimation we do not need to pre-filter the signal with a low-pass filter, since no k-derivatives of the autocovariance are needed.

Modeling in the Autocovariance Domain—Application

As another example of concrete application of the concept of the present invention, we shall demonstrate the method of estimating temporal envelope variation from a signal in the autocovariance domain. The method comprises (or consists of) the following steps:

1. Estimate the autocovariance $q_k$ of signal $x_n$ for a window of length $\Delta t_{win}$ $$q_k=\sum_{n=1}^{\Delta t_{win}} x_n x_{n+k} \text{ for } k\in(-N,N).$$

2. Find the temporal envelope variation h by calculating $$h=\frac{\sum_{k=-N}^{N}(q_k-2kq_{-k})q_{-k}}{2\sum_{k=-N}^{N}kq_{-k}^2}.$$

If a normalized envelope contour is desired instead of only the envelope variation measure h, a further step shall be added optionally:

3. The envelope contour is $$a(t)=a_0e^{ht} \text{ for } t\in(0,\Delta t_{win})$$

where $a_o$ is acquired from the previous frame or an actual estimate of the envelope magnitude. If no measurements of the envelope magnitude are available, we can set $a_0$=1 and calculate the envelope contour iteratively for all consecutive windows.

If additional information is available regarding the properties of the input signal, thresholds can optionally be used to remove infeasible variation estimates. For example, the minimum modeling error from Eq. 11 can optionally be used as an indicator of the quality of the estimate. Particularly, it is possible to set a threshold for the modeling error such that an estimate based on a model with large modeling error may be ignored, since the change exhibited in the model is not well described by the model and the estimate itself is unreliable.

To further improve the accuracy, it is optionally possible to first cancel the formant structure of the input signal (as explained in the section titled "Variation estimation in the autocorrelation domain—Formant structure modeling"). However, note that, in terms of speech signals, we then obtain an estimate of the glottal pressure wave-form instead of the speech signal (speech pressure wave-form) and the temporal envelope models thus the envelope of the glottal pressure, which may or may not be a desired consequence, depending on the application.

Modeling in the Autocovariance Domain—Joint Estimation of Pitch and Envelope Variation Similarly as the envelope variation was estimated in the previous section, also the pitch variation can be estimated directly from a single autocovariance window. However, in this section, we will demonstrate the more general problem of how to jointly estimate pitch and envelope variation from a single autocovariance window. It will then be straightforward for anyone knowledgeable in the art to modify the method for the estimation of the pitch variation only. It should be noted here that it is not necessitated to use any windowing in the autocovariance domain. For example, it is sufficient to compute the autocovariance parameters as outlined in the section titled "Modeling in the Autocovariance domain—Overview". Nevertheless, the expression "single autocovariance window" expresses that the autocovariance estimate of a single fixed portion of the audio signal may be used to estimate variation, in contrast to the autocorrelation, where autocorrelation estimates of at least two fixed portions of the audio signal has to be used to estimate variation. The usage of a single autocovariance window is possible since the autocovariance at lag +k and −k express, respectively the autocovariance k steps forward and backward from a given sample. In other words, since the signal characteristics evolve over time, the autocovariance forward and backward from a sample will be different and this difference in forward and backward autocovariance expresses the magnitude of change in signal characteristics. Such estimation is not possible in the autocorrelation domain, since the autocorrelation domain is symmetric, that is, autocorrelations forward and backward are identical.

Consider a signal x(t)=a(t)f(b(t)), where amplitude and pitch variation are modeled by first order models, whereby $a(t)=a_0e^{ht}$ and $b(t)=b_0te^{ct}$. The autocovariance $Q_x(k)$ of x(t) is then $$Q_x(k,t)=E[x(t)x(t+k)]=a(t)a(t+k)E[f(b(t))f(b(t+k))]=a(t)a(t+k)Q_f(k,t) \tag{13}$$

where $Q_f(k,t)$ is the autocovariance of f(b(t)).

Using Equations 6, 10 and 13, we obtain the time derivative of $Q_x(k,t)$ as $$\left[\frac{\partial Q_x(k,t)}{\partial t}\right] = (2+ck)hQ_x(k,t) - ck\left[\frac{\partial Q_x(k,t)}{\partial k}\right].$$

However, the above equation contains a product ch and is thus not a linear function of c and h. In order to facilitate efficient solution of parameters, we may assume that |ch| is small, whereby we can approximate $$\left[\frac{\partial Q_x(k,t)}{\partial t}\right] = 2hQ_x(k,t) - ck\left[\frac{\partial Q_x(k,t)}{\partial k}\right].$$

As before, we can define $q_k=Q_x(k,t)$ and form the first order Taylor estimate $$\hat{q}_k = q_{-k} + 2hkq_{-k} + ck^2\left[\frac{\partial q_{-k}}{\partial k}\right].$$

The square difference between the true value $q_k$ and the Taylor estimate $\hat{q}_k$ will again serve as our objective function when finding optimal (or at least approximately optimal) c and h. We obtain the minimization problem $$\min_{c,h} \sum_{k=-N}^{N} [q_k - \hat{q}_k]^2$$

whose solution can be readily obtained as $$\begin{bmatrix} h \\ c \end{bmatrix} = A^{-1}u \tag{14}$$

where $$A = \begin{bmatrix} \sum_k 2[q_{-k}k]^2 & \sum_k q_{-k}\frac{\partial q_{-k}}{\partial k}k^3 \\ \sum_k 2q_{-k}\frac{\partial q_{-k}}{\partial k}k^3 & \sum_k \left[\frac{\partial q_{-k}}{\partial k}k^2\right]^2 \end{bmatrix}$$

$$u = \begin{bmatrix} \sum_k [q_k - q_{-k}]q_{-k}k \\ \sum_k [q_k - q_{-k}]\frac{\partial q_{-k}}{\partial k}k^2 \end{bmatrix}$$

Although the formulas appear to be complex, the construction of A and u can be performed using only operations for vectors of length 2N (lag zero can be omitted) and the solution of c and h can be performed using the inversion of the 2×2 matrix A. The computational complexity thus only a modest O(N) (i.e. of the order of N).

The application of joint estimation of pitch and envelope variation follows the same approach as presented in the section titled "Modeling in the autocovariance domain—Application", but using Eq. 14 in Step 2.

Modeling in the Autocovariance Domain—Further Concepts

Figure 5:
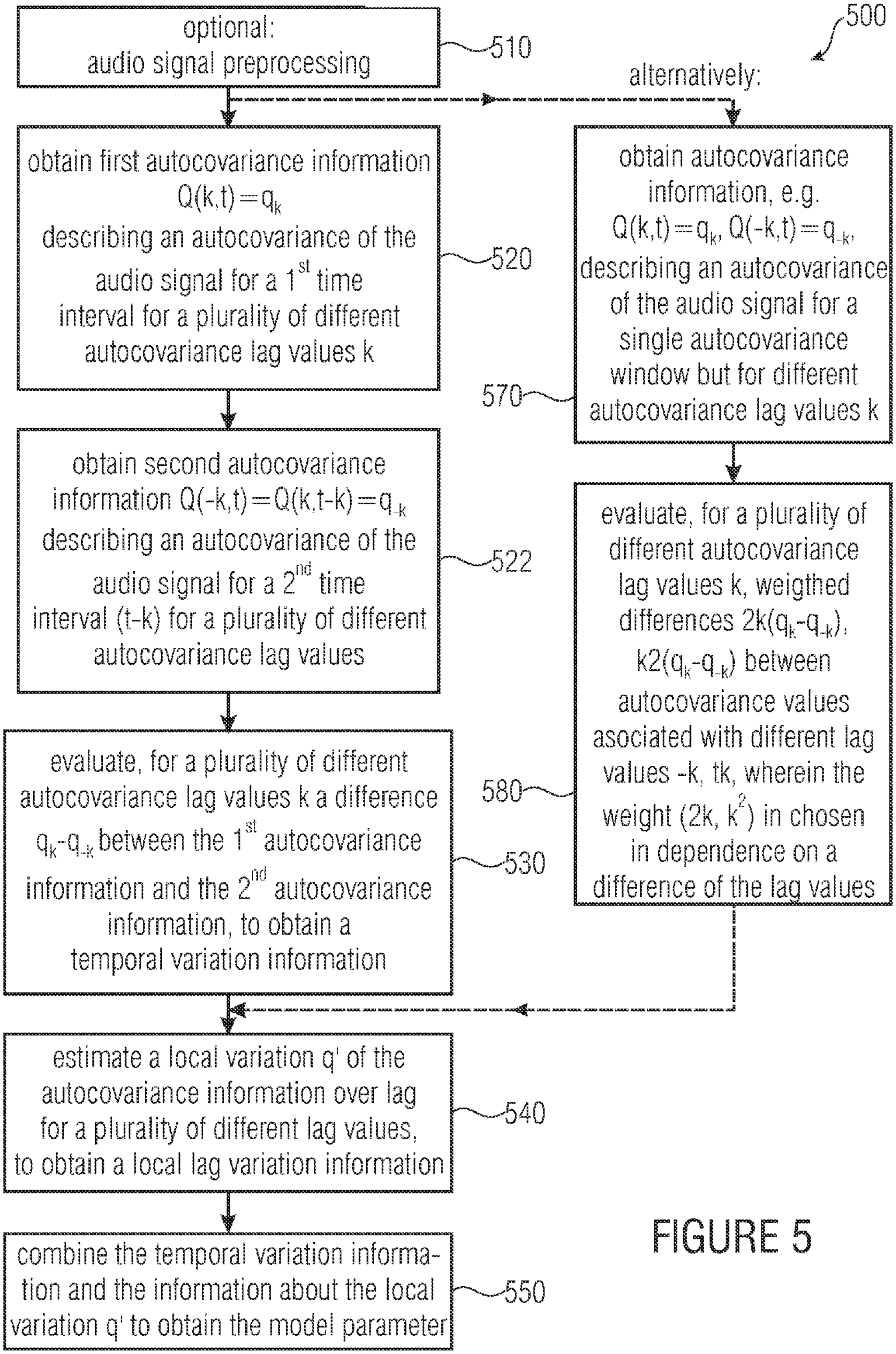
FIG. 5 shows a flow chart of a method for obtaining a parameter describing a temporal variation of a signal characteristic of an audio signal in an autocovariance domain.

In the following, different approaches of modeling the autocovariance domain will be briefly discussed taking reference to FIG. 5. FIG. 5 shows a block schematic diagram of a method 500 for obtaining a parameter describing a temporal variation of signal characteristic of an audio signal, according to an embodiment of the invention. The method 500, comprises, as an optional step 510, an audio signal pre-processing. The audio signal preprocessing in step 510 may, for example, comprise a filtering of the audio signal (for example, a low-pass filtering) and/or a formant structure reduction/removal, as described above. The method 500 may further comprise a step 520 of obtaining first autocovariance information describing an autocovariance of the audio signal for a first time interval and for a plurality of different autocovariance lag values k. The method 500 may also comprise a step 522 of obtaining second autocovariance information describing an autocovariance of the audio signal for a second time interval and for the different autocovariance lag values k. Further, the method 500 may comprise a step 530 of evaluating, for the plurality of different autocovariance lag values k, a difference between the first autocovariance information and the second autocovariance information, to obtain a temporal variation information.

Further, method 500 may comprise a step 540 of estimating a "local" (i.e. in an environment of a respective lag value) variation of the autocovariance information over lag for a plurality of different lag values, to obtain a "local lag variation information".

Also, the method 500 may generally comprise a step 550 of combining the temporal variation information and the information about the local variation q' of the autocovariance information over lag (also designated as "local lag variation information"), to obtain the model parameter.

When combining the temporal variation information and the information about the local variation q' of the autocovariance information over lag, the temporal variation information and/or the information about the local variation q' of the autocovariance information over lag may be scaled in accordance with the corresponding autocovariance lag k, for example, proportional to the autocovariance lag k or a potency thereof.

Alternatively, steps 520, 522 and 530 may be replaced by steps 570, 580, as will be explained in the following. In step 570, an autocovariance information describing an autocovariance of the audio signal for a single autocovariance window but for different autocovariance lag values k may be obtained. For example, an autocovariance value $Q(k,t)=q_k$ and an autocovariance information $q_{-k}=Q(-k,t)$ may be obtained.

Subsequently, weighted differences, e.g. $2k(q_k-q_{-k})$ and/or $k^2(q_k-q_{-k})$, between autocovariance values associated with different lag values (e.g. −k, +k) may be evaluated for a plurality of different autocovariance lag values k in step 580. The weights (e.g. 2k, $k^2$) may be chosen in dependence on a difference of the lag values of the respective subtracted autocovariance values (e.g. the difference in lag between the autocovariance values $q_k, q_{-k}$: $k-(-k)=2k$).

To summarize the above, there are many different ways of obtaining the one or more desired model parameters in the autocovariance domain. In the embodiments, a single autocovariance window may be sufficient in order to estimate one or more temporal variation model parameters. In this case, differences between autocovariance values being associated with different autocovariance lag values may be compared (e.g. subtracted). Alternatively, autocovariance values for different time intervals but same autocovariance lag value may be compared (e.g. subtracted) to obtain temporal variation information. In both cases, weighting may be introduced which takes into account the autocovariance difference or autocovariance lag, when deriving the model parameter.

Modeling in Other Domains

In addition to the autocorrelation and autocovariance, the concept disclosed herein can be formulated also in other domains, such as the Fourier spectrum. When applying the method in domain Ψ, it may comprise the following steps:

1. Transform time signal to domain Ψ.
2. Calculate time derivative(s) in domain Ψ, in a form where the variation model parameters are present in explicit form.
3. Form the Taylor series approximation of the signal in domain Ψ and minimize its fit to the true time evolution, to obtain the variation model parameters.
4. (Optional) Calculate time contour of signal variation.

In a practical application, the application of the inventive concept may, for example, comprise transforming the signal to the desired domain and determining the parameters of a Taylor series approximation, such that the model represented by the Taylor series approximation is adjusted to fit the actual time evolution of the transform-domain signal representation.

In some embodiments, the transform domain can also be trivial, that is, it is possible to apply the model directly in time domain.

As presented in previous sections, the variation model(s) can for example be locally constant(s), polynomial(s) or have other functional form(s).

As demonstrated in previous sections, the Taylor series approximation can be applied either across consecutive windows, within one window, or in a combination of within windows and across consecutive windows.

The Taylor series approximation can be of any order, although first order models are generally attractive since then the parameters can be obtained as solutions to linear equations. Moreover, also other approximation methods known in the art can be used.

Generally, minimization of the mean squared error (MMSE) is a useful minimization criterion, since then parameters can be obtained as solutions to linear equations. Other minimization criterions can be used for improved robustness or when the parameters are better interpreted in another minimization domain.

Apparatus for Encoding an Audio Signal

As already mentioned above, the inventive concept can be applied in an apparatus for encoding an audio signal. For example, the inventive concept is particularly useful whenever an information about a temporal variation of an audio signal is necessitated in an audio encoder (or an audio decoder, or any other audio processing apparatus).

Figure 6:
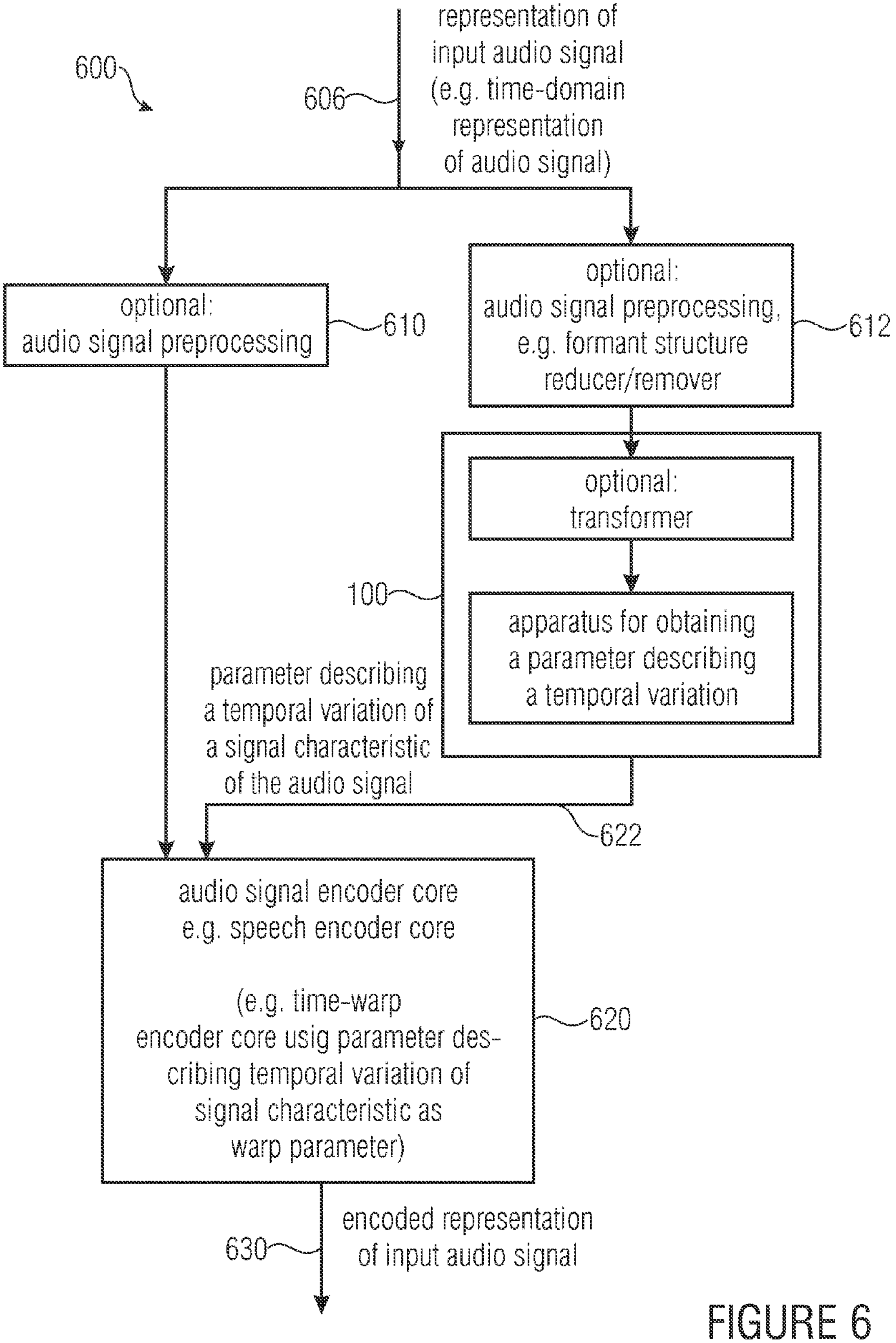
FIG. 6 shows a block schematic diagram of an audio signal encoder, according to the embodiment of the invention.

FIG. 6 shows a block schematic diagram of an audio encoder, according to an embodiment of the invention. The audio encoder shown in FIG. 6 is designated in its entirety with 600. The audio encoder 600 is configured to receive a representation 606 of an input audio signal (e.g. a time-domain representation of an audio signal), and to provide, on the basis thereof, an encoded representation 630 of the input audio signal. The audio encoder 600 comprises, optionally, a first audio signal pre-processor 610 and, further optionally, a second audio signal pre-processor 612. Also, the audio encoder 600 may comprise an audio signal encoder core 620, which may be configured to receive the representation 606 of the input audio signal, or a pre-processed version thereof, provided, for example, by the first audio signal preprocessor 610. The audio signal encoder core 620 is further configured to receive a parameter 622 describing a temporal variation of a signal characteristic of the audio signal 606. Also, the audio signal encoder core 620 may be configured to encode the audio signal 606, or the respective pre-processed version thereof, in accordance to an audio signal encoding algorithm, taking into account the parameter 622. For example, an encoding algorithm of the audio signal encoder core 620 may be adjusted to follow a varying characteristic (described by the parameter 622) of the input audio signal, or to compensate for the varying characteristic of the input audio signal.

Thus, the audio signal encoding is performed in a signal-adaptive way, taking into consideration a temporal variation of the signal characteristics.

The audio signal encoder core 620 may, for example, be optimized to encode music audio signals (for example, using a frequency-domain encoding algorithm). Alternatively, the audio signal encoder may be optimized for speech encoding, and may therefore also be considered as a speech encoder core. However, the audio signal encoder core or speech encoder core may naturally also be configured to follow a so-called "hybrid" approach, exhibiting good performance both for encoding music signals and speech signals.

For example, the audio signal encoder core or speech encoder core 620 may constitute (or comprise) a time-warp encoder core, thus using the parameter 622 describing a temporal variation of a signal characteristic (e.g. pitch) as a warp parameter.

The audio encoder 600 may therefore comprise an apparatus 100, as described with reference to FIG. 1, which apparatus 100 is configured to receive the input audio signal 606, or a preprocessed version thereof (provided by the optional audio signal pre-processor 612) and to provide, on the basis thereof, the parameter information 622 describing a temporal variation of a signal characteristic (e.g. pitch) of the audio signal 606.

Thus, the audio encoder 606 may be configured to make use of any of the inventive concepts described herein for obtaining the parameter 622 on the basis of the input audio signal 606.

Computer Implementation

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein.

Conclusion

In the following, the inventive concept will be briefly summarized taking reference to FIG. 7, which shows a flowchart of a method 700 according to an embodiment of the invention. The method 700 comprises a step 710 of calculating a transform domain representation of an input signal, for example, an input audio signal. The method 700 further comprises a step 730 of minimizing the modeling error of a model describing an effect of the variation in the domain. Modeling 720 the effect of variation in the transform domain may be performed as a part of the method 700, but may also be performed as a preparatory step.

However, when minimizing the modeling error in step 730, both the transform domain representation of the input audio signal and the model describing the effect of variation may be taken into consideration. The model describing the effect of variation may be used in a form describing estimates of a subsequent transform domain representation as an explicit function of previous (or following, or other) actual transform domain parameters, or in a form describing optimal (or at least sufficiently good) variation model parameters as an explicit function of a plurality of actual transform domain parameters (of a transform domain representation of the input audio signal).

Step 730 of minimizing the modeling error results in one or more model parameters describing a variation magnitude.

The optional step 740 of generating a contour results in a description of a contour of the signal characteristic of the input (audio) signal.

To summarize, the above embodiments according to the present invention address one of the most fundamental questions in signal processing, namely, how much does a signal change?

According to the present invention, embodiments provide a method (and an apparatus) for an estimation of variation in signal characteristics, such as a change in fundamental frequency or temporal envelope. For changes in frequency, it is oblivious to octave jumps, robust to errors in the autocorrelation (or autocovariance) simple, yet effective and unbiased.

Specifically, the embodiments according to the present invention comprise the following features:

The variation in signal characteristics (e.g. of the input audio signal) is modeled. In terms of pitch variation or temporal envelope, the model specifies how the autocorrelation or autocovariance (or another transform domain representation) changes over time.

While signal characteristics cannot be assumed to be locally constant, the variation (which may be normalized in some embodiments) in signal characteristics can be assumed constant or to follow a functional form.

By modeling the signal change, its variation (=the time evolution of the signal characteristics) can be modeled.

The signal variation model (e.g. in implicit or explicit functional representation) is fitted to observations (e.g. actual transform domain parameters obtained by transforming the input audio signal) by minimizing the modeling error, whereby the model parameters quantify the magnitude of variation.

In terms of pitch variation estimation, the variation is estimated directly from the signal, without an intermediate step of pitch estimation (e.g. an estimation of an absolute value of the pitch).

By modeling the variation in pitch, the effect of variation can be measured from any lag of the autocorrelation and not only at multiples of the period length, thus enabling usage of all available data and thereby obtaining a high level of robustness and stability.

Even though estimating the autocorrelation or autocovariance from a non-stationary signal introduces bias to the autocorrelation and -covariance estimates, the variation estimate in the present work will still be unbiased in some embodiments.

When the actual characteristics of the signal are sought and not only the variation in characteristics, the method optionally provides an accurate and continuous contour which can be fitted to estimates of signal characteristics along the contour.

In speech and audio coding, the presented method can be used as input for the time-warped MDCT, such that when changes in pitch are known, their effect can be canceled by time-warping, before applying the MDCT. This will reduce smearing of frequency components and thus improve energy compaction.

When estimating from the autocorrelation, consecutive analysis windows may be used to obtain the temporal change. When estimating from the autocovariance, only a single window is needed to measure the temporal change, but consecutive windows can be used when desired.

Jointly estimating changes in both pitch and temporal envelope corresponds to AM-FM analysis of the signal.

In the following, some embodiments according to the invention will be briefly summarized.

According to an aspect, an embodiment according to the invention comprises a signal variation estimator. The signal variation estimator comprises a signal variation modeling in a transform domain, a modeling of time evolution of signal in transform domain, and a model error minimization in terms of fit to input signal.

According to an aspect of the invention, the signal variation estimator estimates variation in the autocorrelation domain.

According to another aspect, the signal variation estimator estimates variation in pitch.

According to an aspect, the present invention creates a pitch variation estimator, wherein the variation model comprises:

A model for shift in autocorrelation lag.

An estimate of autocorrelation lag derivative $$\frac{\partial R}{\partial k}.$$

A model for relation (i.) the time derivative of autocorrelation lag, (ii.) time derivative of autocorrelation and (iii.) autocorrelation lag derivative.

A Taylor series estimate of autocorrelation.

A MMSE estimate of model fit, which yields the pitch variation parameter(s).

According to an aspect of the invention, the pitch variation estimator can be used, in combination with time-warped-modified-discrete-cosine-transform (TW-MDCT, see reference [3]) in speech and audio coding as input (or to provide input) to the time-warped-modified-discrete-cosine-transform (TW-MDCT).

According to an aspect of the invention, the signal variation estimator estimates variation in the autocovariance domain.

According to an aspect, the signal variation estimator estimates a variation in temporal envelope.

According to an aspect, the temporal envelope variation estimator comprises a variation model, the variation model comprising:

A model for the effect of temporal envelope variation on autocovariance as function of lag k.

A Taylor series estimate of autocovariance.

A MMSE estimate of model fit, which yields the envelope variation parameter(s).

According to an aspect, the effect of formant structure is canceled in the signal variation estimator.

According to another aspect, the present invention comprises the usage of signal variation estimates of some characteristics of a signal as additional information for finding accurate and robust estimates of that characteristic.

To summarize, embodiments according to the present invention use variation models for the analysis of a signal. In contrast, conventional methods necessitate an estimate of pitch variation as input to their algorithms, but do not provide a method for estimating the variation.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

References

[1] Y. Bistritz and S. Peller. Immittance spectral pairs (ISP) for speech encoding. In Proc. Acou Speech Signal Processing, ICASSP-93, Minneapolis, Minn., USA, Apr. 27-30, 1993.

[2] A. de Cheveigné and H. Kawahara. YIN, a fundamental frequency estimator for speech and music. J Acoust Soc Am, 111(4):1917-1930, April 2002.

[3] B. Edler, S. Disch, R. Geiger, S. Bayer, U. Kramer, G. Fuchs, M. Neundorf, M. Multrus, G. Schuller and H. Popp. Audio processing using high-quality pitch correction. U.S. Patent application 61/042,314, 2008.

[4] J. Herre and J. D. Johnston. Enhancing the performance of perceptual audio coders by using temporal noise shaping (TNS). In Proc AES Convention 101, Los Angeles, Calif., USA, Nov. 8-11, 1996.

[5] A. Harma. Linear predictive coding with modified filter structures. IEEE Trans. Speech Audio Process., 9(8):769-777, November 2001.

[6] J. Makhoul. Linear prediction: A tutorial review. Proc. IEEE, 63(4): 561-580, April 1975

[7] K. K. Paliwal. Interpolation properties of linear prediction parametric representations. In Proc Eurospeech '95, Madrid, Spain, Sep. 18-21, 1995.

[8] L. Villemoes. Time warped modified transform coding of audio signals. International Patent PCT/EP2006/010246, Published Oct. 5, 2007.

[9] M. Wolfel and J. McDonough. Minimum variance distortionless response spectral estimation. IEEE Signal Process Mag., 22(5):117-126, September 2005.

The invention claimed is:

1. An apparatus for acquiring one or more model parameters describing a variation of a signal characteristic of an audio signal on the basis of actual transform domain parameters of a transform domain representation of the signal describing the signal in a transform domain, the apparatus comprising:

a parameter determinator configured to determine one or more model parameters of a transform-domain variation model, the variation model describing an evolution of transform domain parameters in dependence on the one or more model parameters, such that a model error, representing a deviation between a modelled evolution of the transform domain parameters and an evolution of the actual transform domain parameters, is brought below a predetermined threshold value or minimized;

wherein the apparatus is configured to acquire, as the actual transform-domain parameters, first transform domain information which comprises a first set of transform domain parameters and describes the audio signal for a first time interval for a plurality of different values of the transform variable, and second transform domain information describing the audio signal for a second time interval for the different values of the transform variable;

wherein the parameter determinator is configured to evaluate, for a plurality of different values of the transform variable, a temporal variation between the first transform domain information and the second transform domain information, to acquire temporal variation information, to estimate a local variation of the transform domain information over the transform variable for a plurality of different values of the transform variable, to acquire a local variation information, and to combine the temporal variation information and the local variation information, to acquire a frequency variation model parameter;

wherein the parameter determinator is configured to acquire the frequency variation model parameter using a transform domain variation model comprising the frequency variation model parameter and representing a compression or expansion of the transform domain representation of the audio signal with respect to the transform variable assuming a smooth frequency variation of the audio signal;

wherein the parameter determinator is configured to determine the frequency variation model parameter such that the parameterized transform-domain variation model is adapted to the first set of transform domain parameters and the second set of transform domain parameters.

2. The apparatus according to claim 1, wherein the apparatus is configured to acquire, as the actual transform-domain parameters, a first set of transform domain parameters describing a first time interval of the audio signal in the transform domain for a predetermined set of values of a transform variable, and a second set of transform domain parameters describing a second time interval of the audio signal in the transform domain for the predetermined set of values of the transform variable.

3. The apparatus according to claim 1, wherein the apparatus is configured to acquire, as the actual transform domain parameters, transform domain parameters describing the audio signal in the transform-domain as a function of a transform variable, wherein the transform domain is chosen such that a frequency transposition of the audio signal results at least in a shift of the transform domain representation of the audio signal with respect to the transform variable or in a stretching of the transform domain representation with respect to the transform variable, or in a compression of the transform domain representation with respect to the transform variable;

wherein the parameter determinator is configured to acquire a frequency variation model parameter on the basis of a temporal change of corresponding actual transform domain parameters, taking into consideration a dependence of the transform-domain-representation of the audio signal from the transform variable.

4. The apparatus according to claim 1 wherein the apparatus is configured to acquire, as the actual transform-domain parameters, first autocorrelation information describing an autocorrelation of the audio signal for a first time interval for a plurality of different autocorrelation lag values, and second autocorrelation information describing an autocorrelation of the audio signal for a second time interval for the different autocorrelation lag values;

wherein the parameter determinator is configured to evaluate, for a plurality of different autocorrelation lag values, a temporal variation between the first autocorrelation information and the second autocorrelation information, to acquire temporal variation information, to estimate a local variation of the autocorrelation information over lag for a plurality of different lag values, to acquire a local lag variation information, and to combine the temporal variation information and the local lag variation information, to acquire the model parameter.

5. The apparatus according to claim 4, wherein the parameter determinator is configured to compute an estimated variation parameter $c_h$ using the following equation:

$$\hat{c}_h = \frac{\sum_{k=1}^{N} [R(k, h+1) - R(k, h)] k \frac{\partial}{\partial k} R(k, h)}{\Delta t_{step} \sum_{k=1}^{N} k^2 \left[\frac{\partial}{\partial k} R(k, h)\right]^2},$$

wherein k designates a running variable describing different autocorrelation lag values;

h designates a first time interval;

h+1 designates a second time interval;

N≥2 designates a number of autocorrelation lag values to be evaluated;

R(k,h) designates an autocorrelation of the audio signal ($x_n$) for a window designated by index h R(k,h+1) designates an autocorrelation of the audio signal $x_n$ for a window designated by index h+1; and $$\frac{\partial}{\partial k} R(k, h)$$

R(k,h) designates a variation of the autocorrelation $R(k$, over a lag for a window designated by index h in a surrounding of the lag designated by k.

6. The apparatus according to claim 1, wherein the apparatus is configured to acquire, as the actual transform-domain parameters, first autocovariance information describing an autocovariance of the audio signal for a first time interval for a plurality of different autocorrelation lag values and second autocovariance information describing an autocovariance of the audio signal for a second time interval for a plurality of different autocorrelation lag values; and wherein the parameter determinator is configured to evaluate, for a plurality of different autocovariance lag values, a variation between the first autocovariance information and the second autocovariance information, to acquire temporal variation information, to estimate a local derivative of the autocovariance information over lag for a plurality of different lag values, to acquire a local lag variation information, and to combine the temporal variation information and the local lag variation information, to acquire the model parameter.

7. The apparatus according to claim 1, wherein the apparatus is configured to acquire autocovariance information describing an autocovariance of the audio signal for a single autocovariance window but for different autocovariance lag values, to evaluate, for a plurality of different pairs of autocovariance lag values, weighted differences between the pairs of autocovariance values, wherein the weight is chosen in dependence on a difference of the lag values of the respective pairs of lag values, and in dependence on a variation of the autocovariance values over lag, to sum-combine different weighted difference values, to acquire a combination value, and to acquire the model parameters on the basis of the combination value.

8. The apparatus according to claim 1, wherein the apparatus is configured to acquire a parameter describing a temporal variation of an envelope of the audio signal, wherein the parameter determinator is configured to acquire a plurality of transform-domain parameters describing a signal power of the audio signal for a plurality of time intervals, wherein the parameter determinator is configured to acquire an envelope variation model parameter using a representation of a parameterized transform-domain variation model comprising an envelope variation model parameter and representing a temporal increase in power or a temporal decrease in power of the transform-domain representation of the audio signal assuming a smooth envelope variation of the audio signal, and wherein the parameter determinator is configured to determine the envelope variation model parameter such that the parameterized transform-domain variation model is adapted to the transform-domain parameters.

9. The apparatus according to claim 8, wherein the parameter determinator is configured to acquire a plurality of autocorrelation parameters or autocovariance parameters for a given autocorrelation lag or autocovariance lag, and wherein the parameter determinator is configured to determine a plurality of polynomial parameters of a polynomial envelope variation model.

10. The apparatus according to claim 1, wherein the apparatus is configured to acquire autocorrelation domain parameters describing the audio signal in an autocorrelation domain, and wherein the parameter determinator is configured to determine one or more model parameters of an autocorrelation domain variation model; or wherein the apparatus is configured to acquire autocovariance domain parameters describing the audio signal in an autocovariance domain, and wherein the parameter determinator configured to determine one or more model parameters of an autocovariance domain variation model.

11. The apparatus according to claim 1, wherein the transform-domain variation model describes a temporal variation of a pitch of the audio signal, or wherein the transform-domain variation model describes a temporal variation of an envelope of the audio signal, or wherein the transform-domain variation model describes a simultaneous temporal variation of a pitch and of an envelope of the audio signal.

12. The apparatus according to claim 1, wherein the apparatus comprises a formant-structure-reducer configured to preprocess an input audio signal, to acquire a formant-structure-reduced audio signal; and wherein the apparatus is configured to acquire the actual transform-domain parameter on the basis of the formant-structure-reduced audio signal;

wherein the formant-structure-reducer is configured to estimate parameters of a linear-predictive model of the input audio signal on the basis of a high-pass filtered version of the input audio signal, and to filter a broad band version of the input audio signal on the basis of the estimated parameters of the linear-predictive model, to acquire the formant-structure-reduced audio signal such that the formant-structure-reduced audio signal comprises a low-pass characteristic.

13. The apparatus according to claim 1, wherein the parameter determinator is configured to adapt the transform-domain variation model, describing a temporal evolution of transform domain parameters in dependence on one or more model parameters representing a signal characteristic, to the signal represented by the actual transform domain parameters.

14. The apparatus according to claim 1, wherein the parameter determinator is configured to evaluate, for a plurality of different values of the transform variable, differences between pairs of transform domain values of the first set of transform domain parameters and the second set of transform domain parameters associated with same values of the transform variable, to acquire the temporal variation information.

15. The apparatus according to claim 1, wherein the parameter determinator is configured to use all available transform domain values, for any value of the transform variable, to acquire the temporal variation information.

16. A time-warped audio encoder for time-warped encoding an input audio signal, the time-warped audio encoder comprising:

an apparatus for acquiring a parameter describing a temporal variation of a signal characteristic of an audio signal, according to claim 1, wherein the apparatus for acquiring a parameter is configured to acquire a pitch variation parameter describing a temporal pitch variation of the input audio signals; and a time-warped-signal processor configured to perform a time-warped signal sampling of the input audio signal using the pitch variation parameter for an adjustment of the time-warp.

17. A method for acquiring one or more model parameters describing a variation of a signal characteristic for an audio signal on the basis of actual transform-domain parameters describing the audio signal in a transformed domain, the method comprising:

determining one or more model parameters of a transform-domain variation model, the variation model describing an evolution of transform-domain parameters in dependence on the one or more model parameters, such that a model error, representing a deviation between a modeled temporal evolution of the transform-domain parameters and an evolution of the actual transform-domain parameters, is brought below a predetermined threshold value or minimized;

wherein first transform domain information comprising a first set of transform domain parameters and describing the audio signal for a first time interval for a plurality of different values of a transform variable, and second transform domain information comprising a second set of transform domain parameters and describing the audio signal for a second time interval for the different values of the transform variable are acquired as the actual transform-domain parameters;

wherein a temporal variation between the first transform domain information and the second transform domain information is evaluated for a plurality of different values of the transform variable, to acquire temporal variation information, wherein a local variation of the transform domain information over the transform variable is estimated for a plurality of different values of the transform variable, to acquire a local variation information;

wherein the temporal variation information and the local variation information are combined, to acquire a frequency variation model parameter;

wherein the frequency variation model parameter is acquired using a transform domain variation model comprising the frequency variation model parameter and representing a compression or expansion of the transform domain representation of the audio signal with respect to the transform variable assuming a smooth frequency variation of the audio signal; and wherein the frequency variation model parameter is determined such that the parameterized transform-domain variation model is adapted to the first set of transform domain parameters and the second set of transform domain parameters.

18. A non-transitory computer readable medium including a computer program for performing the method according to claim 17, when the computer program runs in a computer.

19. An apparatus for acquiring one or more model parameters describing a variation of a signal characteristic of an audio signal on the basis of actual transform domain parameters of a transform domain representation of the audio signal describing the audio signal in a transform domain, the apparatus comprising:

a parameter determinator configured to determine one or more model parameters of a transform-domain variation model, the variation model describing an evolution of transform domain parameters in dependence on the one or more model parameters, such that a model error, representing a deviation between a modelled evolution of the transform domain parameters and an evolution of the actual transform domain parameters, is brought below a predetermined threshold value or minimized;

wherein the apparatus is configured to acquire autocovariance information describing an autocovariance of the audio signal for a single autocovariance window but for different autocovariance lag values, to evaluate, for a plurality of different pairs of autocovariance lag values, weighted differences between the pairs of autocovariance values, wherein the weight is chosen in dependence on a difference of the lag values of the respective pairs of lag values, and in dependence on a variation of the autocovariance values over lag, to sum-combine different weighted difference values, to acquire a combination value, and to acquire the model parameters on the basis of the combination value.

20. A time-warped audio encoder for time-warped encoding an input audio signal, the time-warped audio encoder comprising:

an apparatus for acquiring a parameter describing a temporal variation of a signal characteristic of an audio signal, according to claim 19, wherein the apparatus for acquiring a parameter is configured to acquire a pitch variation parameter describing a temporal pitch variation of the input audio signals; and a time-warped-signal processor configured to perform a time-warped signal sampling of the input audio signal using the pitch variation parameter for an adjustment of the time-warp.

21. A method for acquiring one or more model parameters describing a variation of a signal characteristic for an audio signal on the basis of actual transform-domain parameters of a transform-domain representation of the audio signal describing the audio signal in a transformed domain, the method comprising:

determining one or more model parameters of a transform-domain variation model, the transform-domain variation model describing an evolution of transform-domain parameters in dependence on the one or more model parameters, such that a model error, representing a deviation between a modeled temporal evolution of the transform-domain parameters and an evolution of the actual transform-domain parameters, is brought below a predetermined threshold value or minimized;

wherein an autocovariance information describing an autocovariance of the audio signal for a single autocovariance window but for different autocovariance lag values is acquired;

wherein weighted differences between pairs of autocovariance values are evaluated for a plurality of different pairs of autocovariance lag values, wherein the weight is chosen in dependence on a difference of the lag values of the respective pairs of lag values, and in dependence on a variation of the autocovariance values over lag, wherein different weighted difference values are sum-combined, to acquire a combination value; and wherein the one or more model parameters are acquired on the basis of the combination value.

22. A non-transitory computer readable medium including a computer program for performing the method according to claim 21, when the computer program runs in a computer.

23. An apparatus for acquiring one or more model parameters describing a variation of a signal characteristic of an audio signal on the basis of actual transform domain parameters of a transform-domain representation of the audio signal describing the audio signal in a transform domain, the apparatus comprising:

a parameter determinator configured to determine one or more model parameters of a transform-domain variation model, the variation model describing an evolution of transform domain parameters in dependence on the one or more model parameters, such that a model error, representing a deviation between a modeled evolution of the transform domain parameters and an evolution of the actual transform domain parameters, is brought below a predetermined threshold value or minimized;

wherein the apparatus is configured to acquire a model parameter describing a temporal variation of an envelope of the audio signal, wherein the parameter determinator is configured to acquire a plurality of transform-domain parameters describing a signal power of the audio signal for a plurality of time intervals, wherein the parameter determinator is configured to acquire the envelope variation model parameter using a representation of a parameterized transform-domain variation model comprising the envelope variation model parameter and representing a temporal increase in power or a temporal decrease in power of the transform-domain representation of the audio signal assuming a smooth envelope variation of the audio signal, and wherein the parameter determinator is configured to determine the envelope variation model parameter such that the parameterized transform-domain variation model is adapted to the transform-domain parameters; and wherein the parameter determinator is configured to acquire a plurality of autocorrelation parameters or autocovariance parameters for a given autocorrelation lag or autocovariance lag, and wherein the parameter determinator is configured to determine a plurality of polynomial parameters of a polynomial envelope variation model.

24. A time-warped audio encoder for time-warped encoding an input audio signal, the time-warped audio encoder comprising:

an apparatus for acquiring a parameter describing a temporal variation of a signal characteristic of an audio signal, according to claim 23, wherein the apparatus for acquiring a parameter is configured to acquire a pitch variation parameter describing a temporal pitch variation of the input audio signals; and a time-warped-signal processor configured to perform a time-warped signal sampling of the input audio signal using the pitch variation parameter for an adjustment of the time-warp.

25. A method for acquiring one or more model parameters describing a variation of a signal characteristic for an audio signal on the basis of actual transform-domain parameters of a transform-domain representation of the audio signal describing the audio signal in a transformed domain, the method comprising:

determining one or more model parameters of a transform-domain variation model, the variation model describing an evolution of transform-domain parameters in dependence on the one or more model parameters, such that a model error, representing a deviation between a modeled temporal evolution of the transform-domain parameters and an evolution of the actual transform-domain parameters, is brought below a predetermined threshold value or minimized;

wherein a plurality of transform-domain parameters describing a signal power of the audio signal for a plurality of time intervals is acquired;

wherein a plurality of polynomial parameters of a polynomial envelope variation model are determined, wherein the envelope variation model parameters are acquired using a representation of a parameterized transform-domain variation model comprising the envelope variation model parameters and representing a temporal increase in power or a temporal decrease in power of the transform-domain representation of the audio signal assuming a smooth envelope variation of the audio signal, wherein the envelope variation model parameters are determined such that the parameterized transform-domain variation model is adapted to the transform-domain parameters, wherein a plurality of autocorrelation parameters or autocovariance parameters are acquired for a given autocorrelation lag or autocovariance lag.

26. A non-transitory computer readable medium including a computer program for performing the method according to claim 25, when the computer program runs in a computer.

27. An apparatus for acquiring one or more model parameters describing a variation of a signal characteristic of an audio signal on the basis of actual transform domain parameters of a transform domain representation of the audio signal describing the audio signal in a transform domain, the apparatus comprising:

a parameter determinator configured to determine one or more model parameters of a transform-domain variation model, the variation model describing an evolution of transform domain parameters in dependence on one or more model parameters, such that a model error, representing a deviation between a modelled evolution of the transform domain parameters and an evolution of the actual transform domain parameters, is brought below a predetermined threshold value or minimized;

wherein the apparatus comprises a formant-structure-reducer configured to preprocess an input audio signal, to acquire a formant-structure-reduced audio signal;

wherein the apparatus is configured to acquire the actual transform-domain parameter on the basis of the formant-structure-reduced audio signal;

wherein the formant-structure-reducer is configured to estimate parameters of a linear-predictive model of the input audio signal on the basis of a high-pass filtered version of the input audio signal, and to filter a broad band version of the input audio signal on the basis of the estimated parameters of the linear-predictive model, to acquire the formant-structure-reduced audio signal such that the formant-structure-reduced audio signal comprises a low-pass characteristic.

28. A time-warped audio encoder for time-warped encoding an input audio signal, the time-warped audio encoder comprising:

an apparatus for acquiring a parameter describing a temporal variation of a signal characteristic of an audio signal, according to claim 27, wherein the apparatus for acquiring a parameter is configured to acquire a pitch variation parameter describing a temporal pitch variation of the input audio signals; and a time-warped-signal processor configured to perform a time-warped signal sampling of the input audio signal using the pitch variation parameter for an adjustment of the time-warp.

29. A method for acquiring one or more model parameters describing a variation of a signal characteristic for an audio signal on the basis of actual transform-domain parameters of a transform-domain representation of the audio signal describing the audio signal in a transformed domain, the method comprising:

determining one or more model parameters of a transform-domain variation model, the variation model describing an evolution of transform-domain parameters in dependence on one or more model parameters, such that a model error, representing a deviation between a modeled temporal evolution of the transform-domain parameters and an evolution of the actual transform-domain parameters, is brought below a predetermined threshold value or minimized;

wherein an input audio signal is preprocessed, to acquire a formant-structure-reduced audio signal;

wherein the actual transform-domain parameter is acquired on the basis of the formant-structure-reduced audio signal;

wherein parameters of a linear-predictive model of the input audio signal are estimated on the basis of a high-pass filtered version of the input audio signal;

wherein a broad band version of the input audio signal is filtered on the basis of the estimated parameters of the linear-predictive model, to acquire the formant-structure-reduced audio signal such that the formant-structure-reduced audio signal comprises a low-pass characteristic.

30. A non-transitory computer readable medium including a computer program for performing the method according to claim 29, when the computer program runs in a computer.

* * * * *

UNITED STATES PATENT AND TRADEMARK OFFICE

CERTIFICATE OF CORRECTION

PATENT NO. : 8,571,876 B2
APPLICATION NO. : 13/186688
DATED : October 29, 2013
INVENTOR(S) : Tom Baeckstroem et al.

It is certified that error appears in the above-identified patent and that said Letters Patent is hereby corrected as shown below:

In the Claims

Please correct Claim 5, Column 36, line 27 as follows:

"…variation parameter $\underline{\hat{c}_{h}}$ [[$^{Ch}$]] using the following equation…"

And please correct Claim 5, Column 36, line 54 as follows:

"designates a variation of the autocorrelation $R(k,h)$ over a lag for a"

Signed and Sealed this
Twenty-first Day of October, 2014

Michelle K. Lee
*Deputy Director of the United States Patent and Trademark Office*